United States Patent
Kawai

(10) Patent No.: US 10,414,176 B2
(45) Date of Patent: Sep. 17, 2019

(54) PRINTED-MATTER PRODUCING DEVICE AND MEDIUM

(71) Applicant: BROTHER KOGYO KABUSHIKI KAISHA, Nagoya-shi, Aichi (JP)

(72) Inventor: Ryuji Kawai, Nagoya (JP)

(73) Assignee: Brother Kogyo Kabushiki Kaisha, Nagoya-shi, Aichi (JP)

(*) Notice: Subject to any disclaimer, the term of this patent is extended or adjusted under 35 U.S.C. 154(b) by 0 days.

(21) Appl. No.: 16/032,268

(22) Filed: Jul. 11, 2018

(65) Prior Publication Data

US 2019/0016161 A1    Jan. 17, 2019

(30) Foreign Application Priority Data

Jul. 12, 2017  (JP) .................................. 2017-136507

(51) Int. Cl.
  *B41J 11/66* (2006.01)
  *B41J 11/70* (2006.01)
  *B41J 13/00* (2006.01)
  *B41J 3/407* (2006.01)

(52) U.S. Cl.
  CPC ........... *B41J 11/663* (2013.01); *B41J 3/4075* (2013.01); *B41J 11/703* (2013.01); *B41J 13/0009* (2013.01)

(58) Field of Classification Search
  CPC . B41J 3/4075; B41J 11/66; B41J 11/70; B41J 13/00
  See application file for complete search history.

(56) References Cited

U.S. PATENT DOCUMENTS

| | | | | |
|---|---|---|---|---|
| 6,707,571 | B1* | 3/2004 | Kurashina | B41J 3/4075 347/40 |
| 9,120,330 | B1* | 9/2015 | Nakamura | B41J 11/663 |
| 2009/0319072 | A1* | 12/2009 | Fukui | B41J 3/4075 700/110 |
| 2016/0121632 | A1 | 5/2016 | Ozawa | |
| 2016/0271975 | A1* | 9/2016 | Kondo | B41J 11/703 |

FOREIGN PATENT DOCUMENTS

| | | |
|---|---|---|
| JP | H07-266622 A | 10/1995 |
| JP | 2001-130074 A | 5/2001 |
| JP | 2016-088083 A | 5/2016 |

* cited by examiner

*Primary Examiner* — Anh T Vo
(74) *Attorney, Agent, or Firm* — Scully, Scott, Murphy & Presser, PC

(57) ABSTRACT

The disclosure discloses a printed-matter producing device including a cutting device, and a controller. The cutting device is disposed downstream of a thermal head at a predetermined separation distance. The controller is configured to execute a coordination control process, a data acquisition process, and a data shift process. In the coordination control process, a feeder, the thermal head, and the cutting device are controlled in coordination with each other to form a print while feeding a print-receiving medium, to stop the feeding after feeding by a first feeding distance corresponding to the separation distance and to execute a cutting process, and to subsequently resume the feeding to produce a printed matter. In the data shift process, a facing position on the print data corresponding to a position at which the thermal head faces the print-receiving medium is shifted.

11 Claims, 14 Drawing Sheets

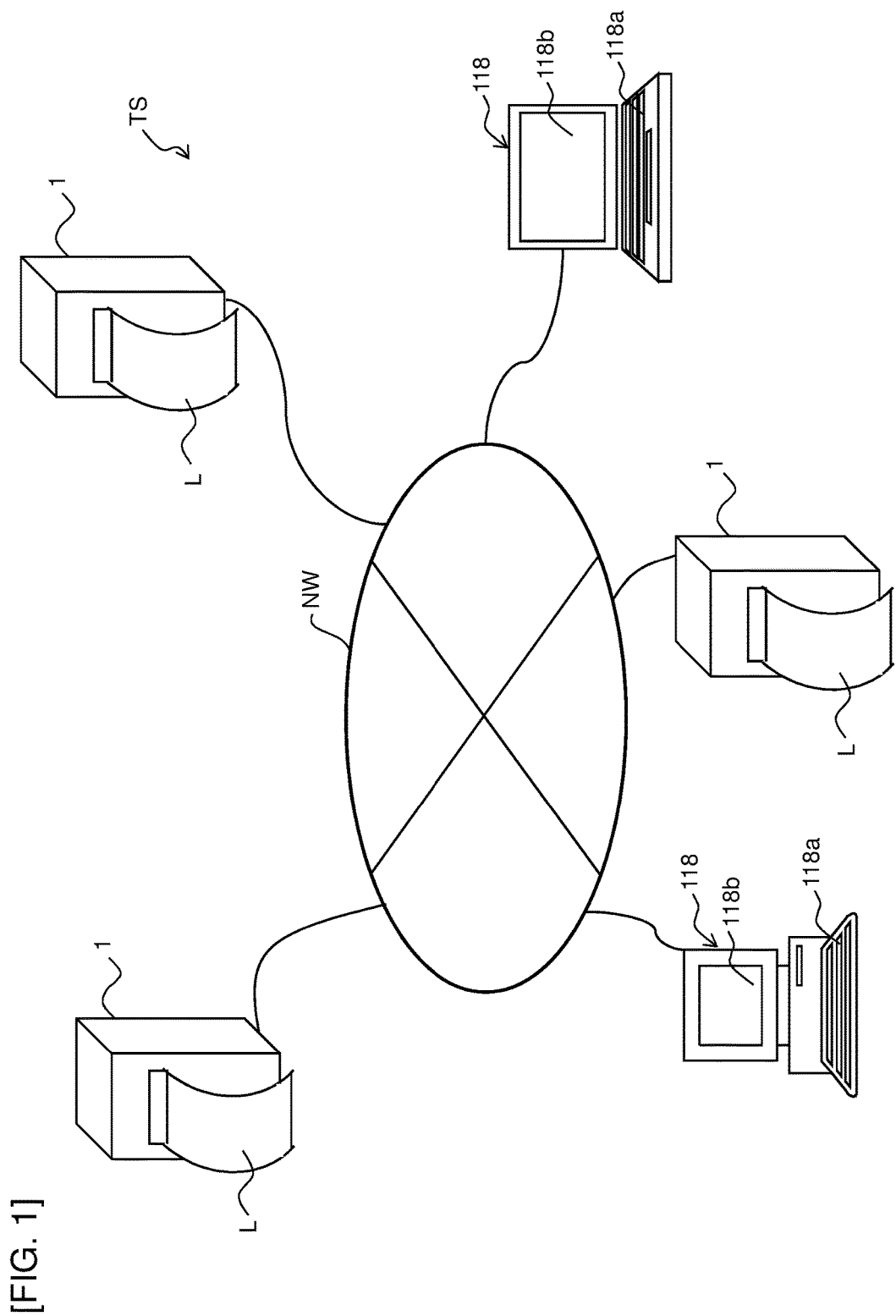
[FIG. 1]

[FIG. 2]
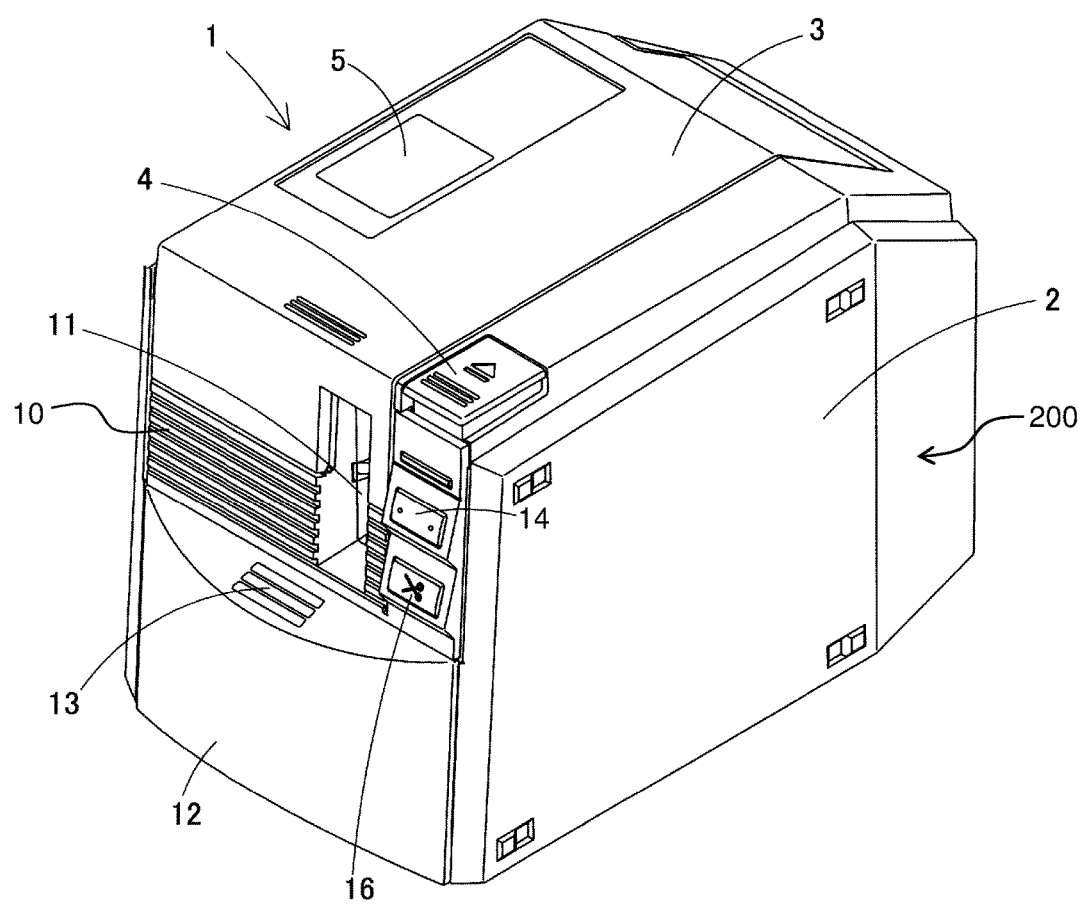

[FIG. 3]
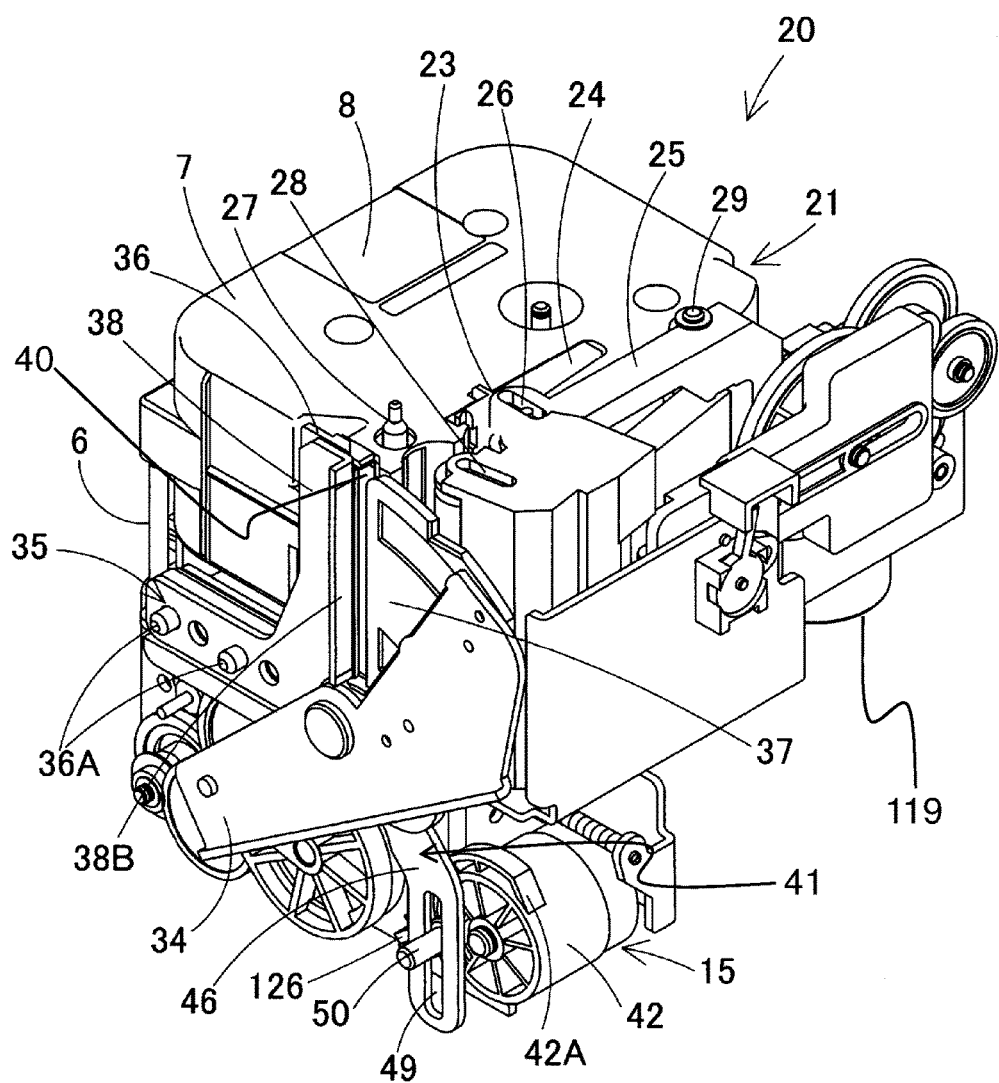

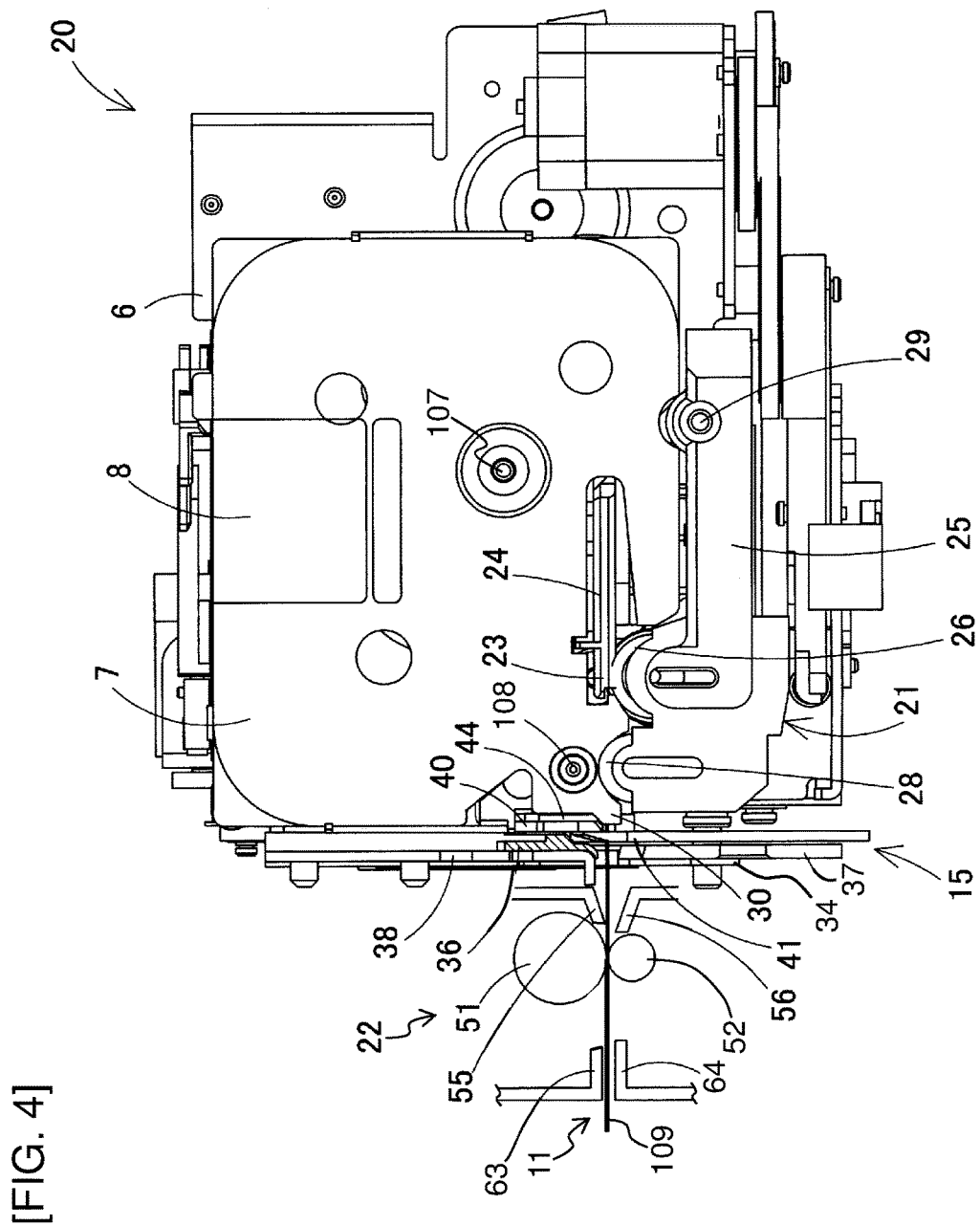
[FIG. 4]

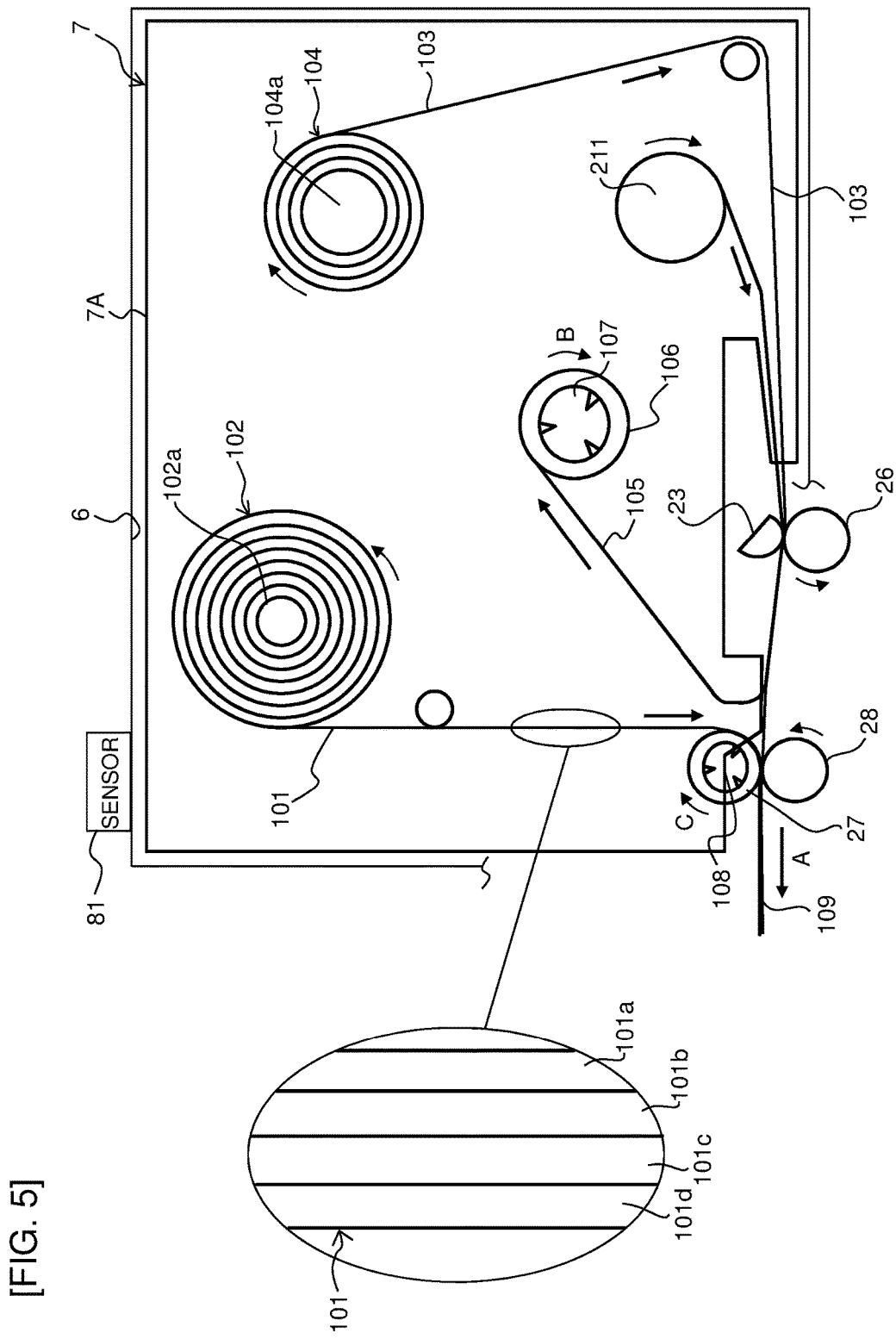
[FIG. 5]

[FIG. 6]
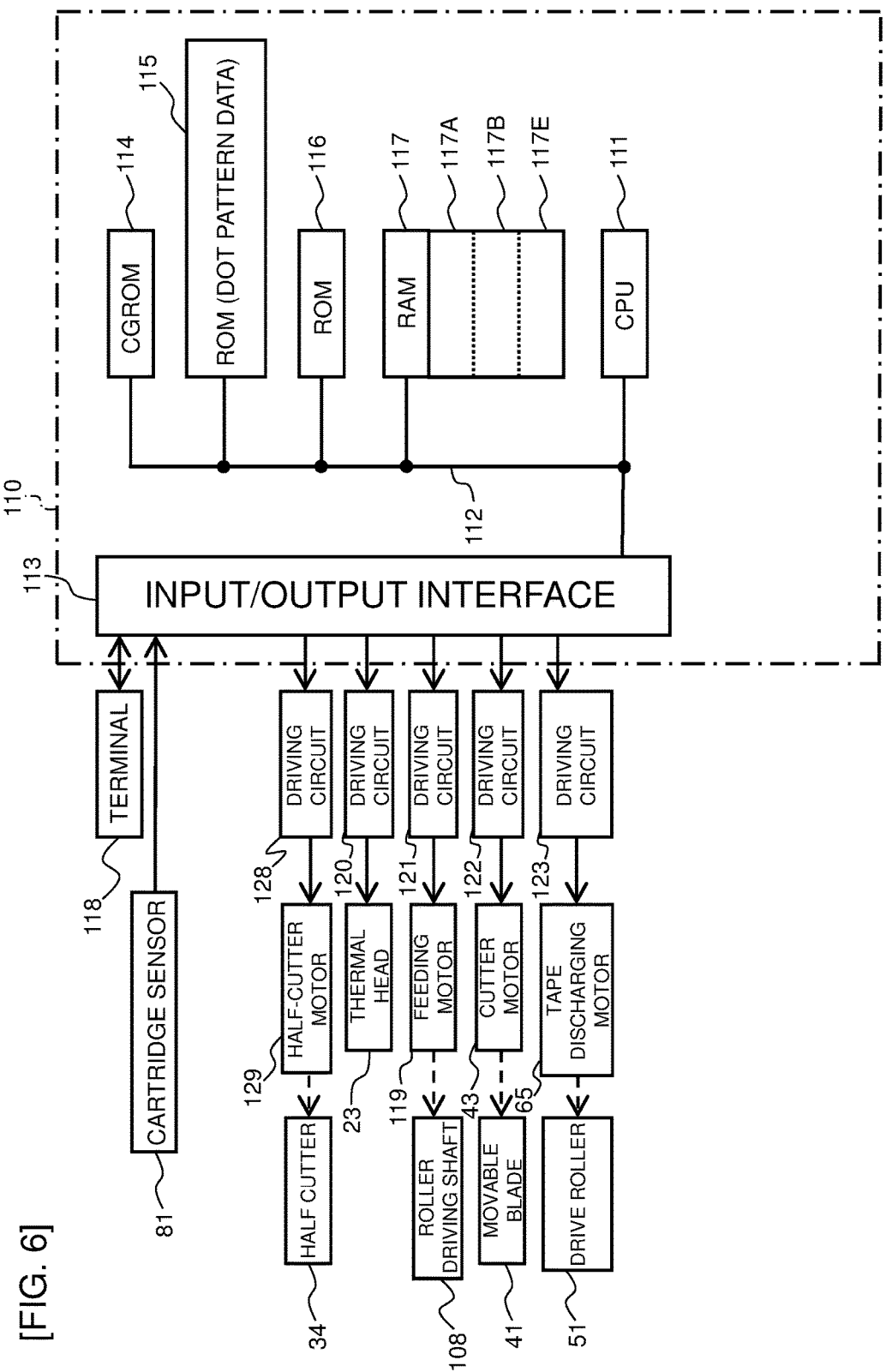

[FIG. 7]
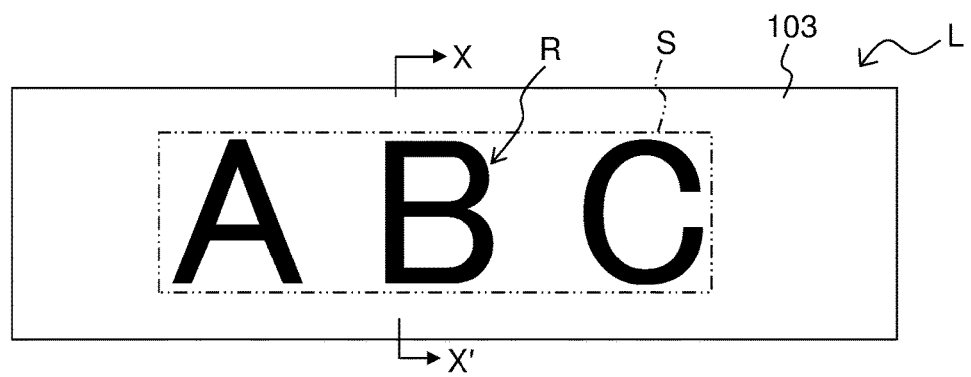
[FIG. 8]
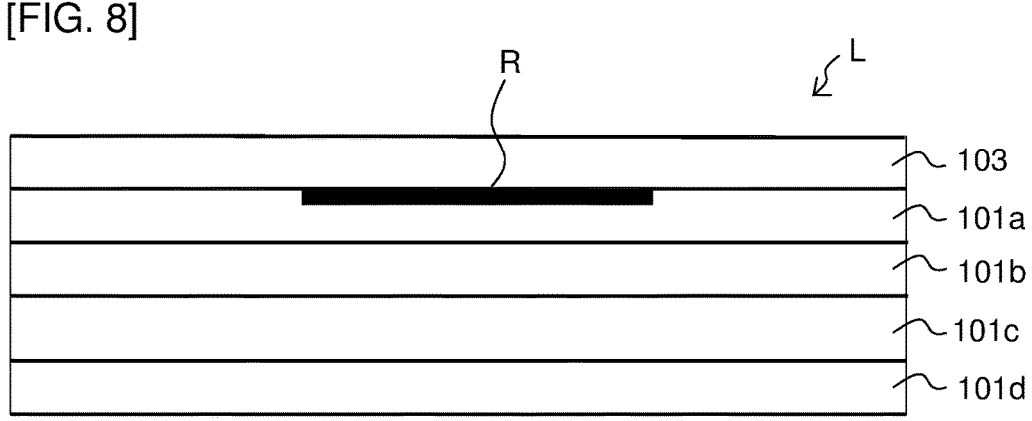

COMPARATIVE EXAMPLE
[FIG. 9A]
[FIG. 9B]
[FIG. 9C]
[FIG. 9D]
[FIG. 9E]
[FIG. 9F]
[FIG. 9G]
[FIG. 9H]
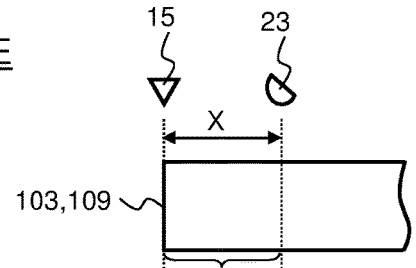
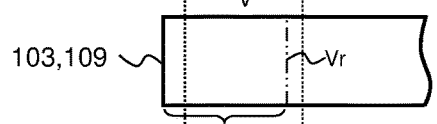
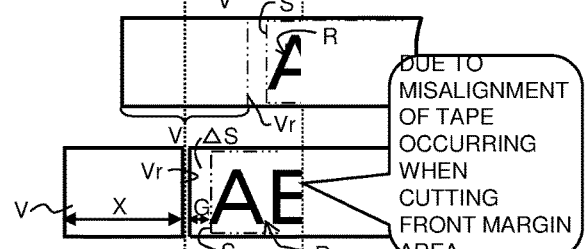
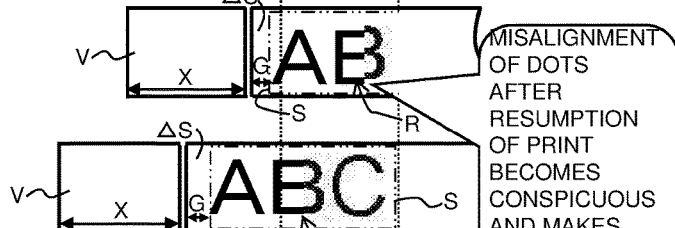
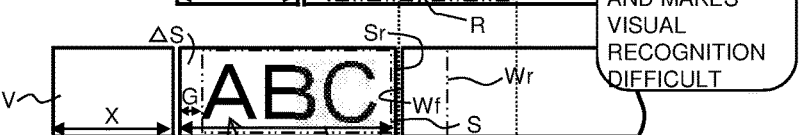
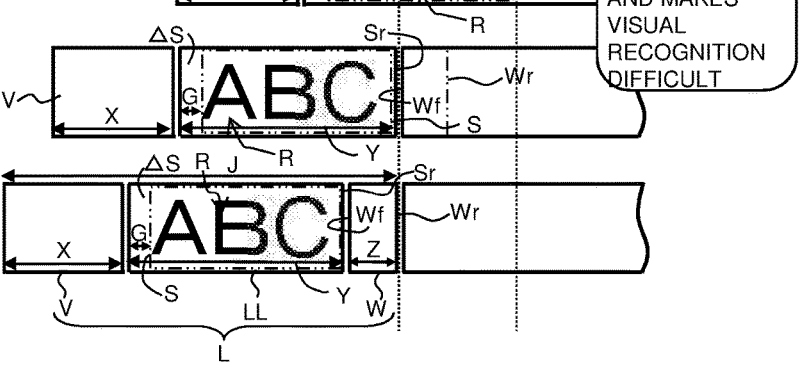

EMBODIMENT
[FIG. 10A]
[FIG. 10B]
[FIG. 10C]
[FIG. 10D]
[FIG. 10E]
[FIG. 10F]
[FIG. 10G]
[FIG. 10H]
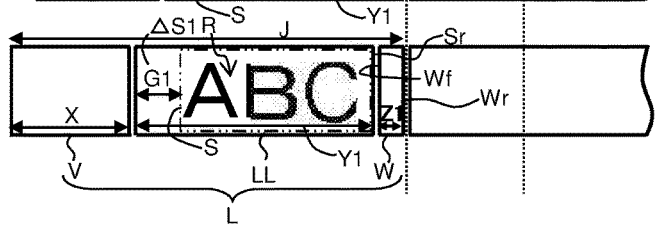

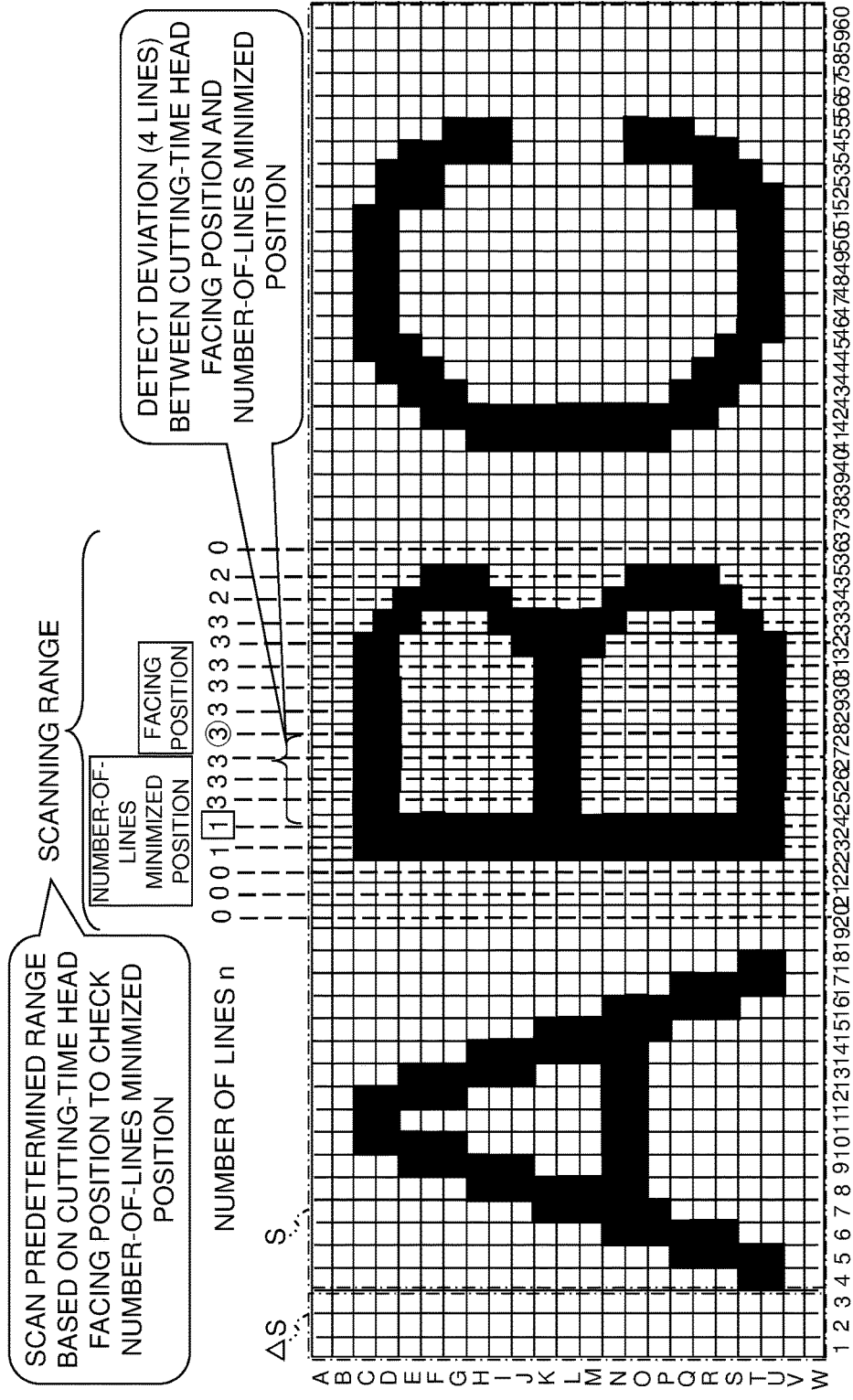

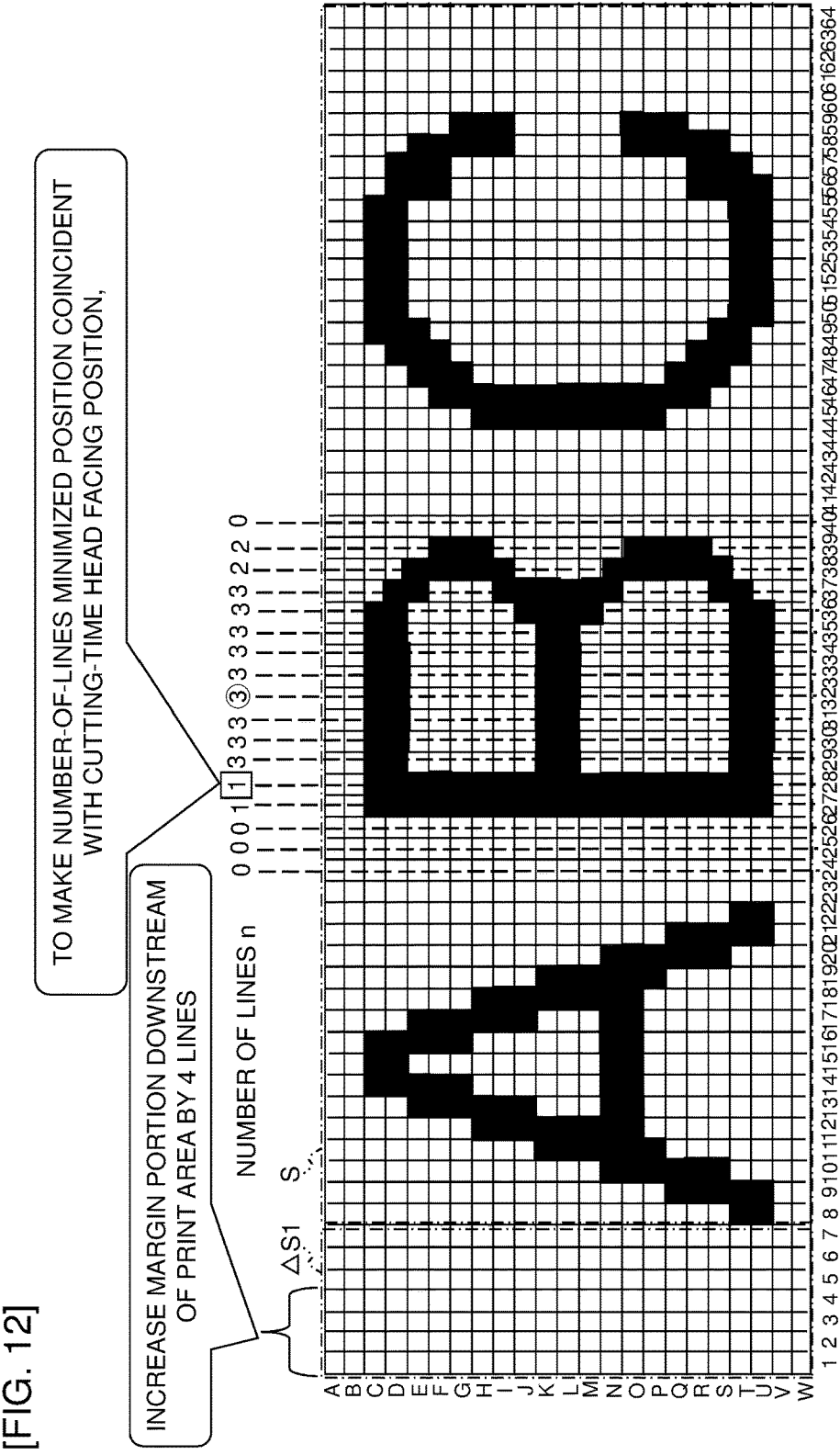
[FIG. 12]

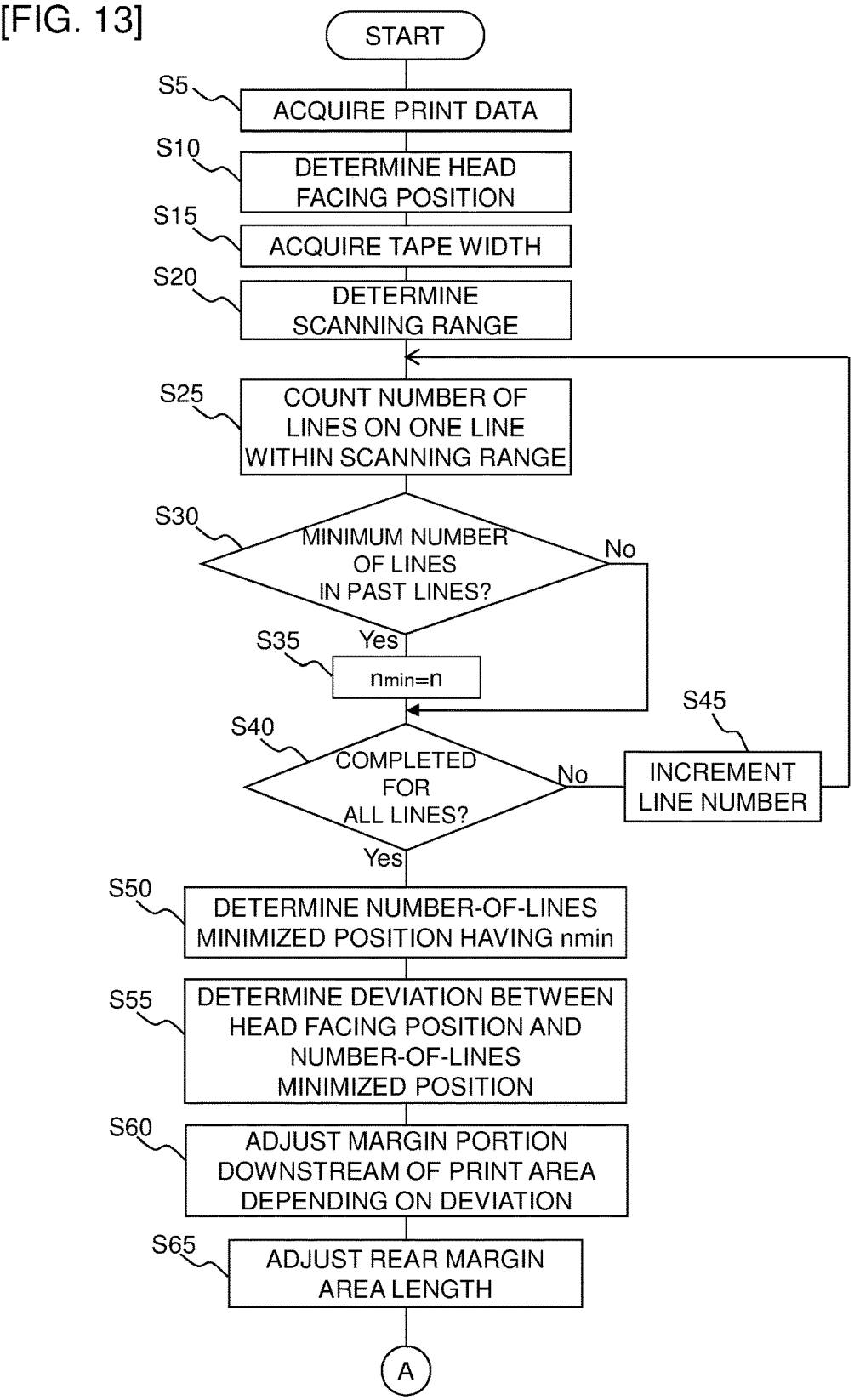
[FIG. 13]

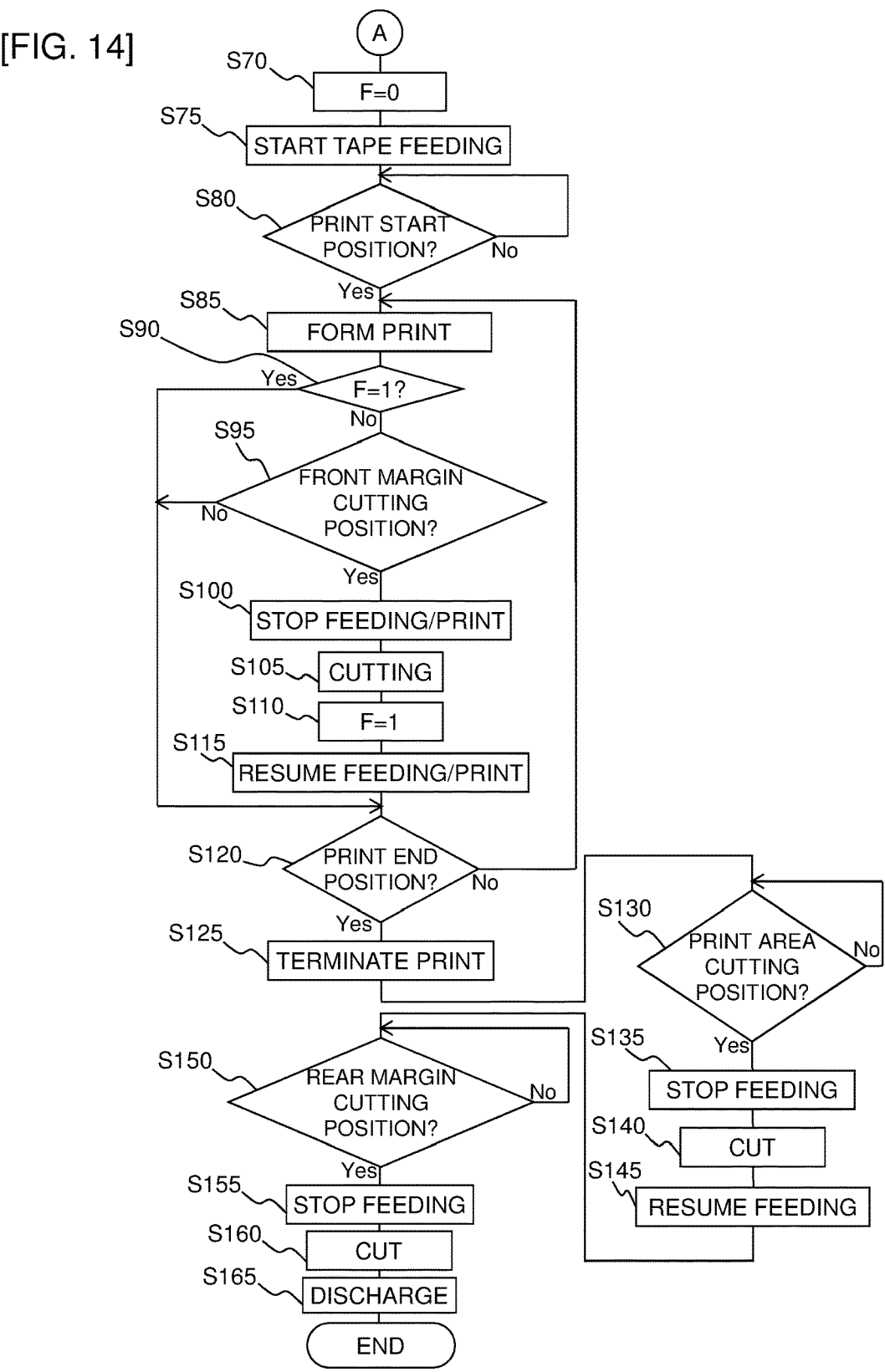

[FIG. 15A]

| TAPE WIDTH | SCANNING RANGE |
|---|---|
| SMALL | WIDE |
| MEDIUM | MEDIUM |
| LARGE | NARROW |

[FIG. 15B]

| NUMBER OF TIMES OF CUTTING OPERATION | SCANNING RANGE |
|---|---|
| SMALL | NARROW |
| MEDIUM | MEDIUM |
| LARGE | WIDE |

[FIG. 15C]

| TYPE OF ADHESIVE | SCANNING RANGE |
|---|---|
| WEAK ADHESIVE | NARROW |
| STANDARD | MEDIUM |
| STRONG ADHESIVE | WIDE |

PRINTED-MATTER PRODUCING DEVICE AND MEDIUM

CROSS-REFERENCE TO RELATED APPLICATION

The present application claims priority from Japanese Patent Application No. 2017-136507, which was filed on Jul. 12, 2017, the disclosure of which is incorporated herein by reference in its entirety.

BACKGROUND

Field

The present disclosure relates to a printed-matter producing device producing a printed matter having a desired print formed on a print-receiving medium.

Description of the Related Art

A printed-matter producing device forming a print on a print-receiving medium is known. In this printed-matter producing device, a print is formed on a fed label tape (print-receiving medium) by a thermal head, and the label tape is cut by a cutter to form one label (printed matter).

In this prior art, the cutter is located downstream of the thermal head along a feeding path, and a predetermined interval (separation distance) exists between the thermal head and the cutter. Consequently, when the cutter cuts a rear end of the label at the time of production of the one label, a downstream end portion of the label tape following the cutting position has an unnecessary margin (front margin area) generated as a margin portion in which a print cannot be formed. Therefore, after the feeding of the label tape is started as described above for newly producing a printed matter and print formation is started onto a print area of the label tape, when a rear end portion of the unnecessary margin faces the cutter (i.e., when the label tape is fed by a feeding distance corresponding to the separation distance), the print formation and the feeding are stopped, and the label tape is cut at the position to separate the unnecessary margin from the new label. Subsequently, the interrupted print formation and feeding are resumed, and when the print formation onto the print area is finished, the production of the label is completed.

As described above, in the present disclosure, the print formation (printing) is interrupted due to cutting by the cutter in the middle of the print formation onto the print area, and the print formation is resumed after completion of the cutting. In this regard, misalignment of the label tape (printing-receiving medium) during cutting may cause misalignment, disorder, etc. of dots between a print formed on the label tape before the cutting and a print formed on the label tape after resumption of the print formation, so that the aesthetic appearance of the label (printed matter) may be deteriorated. In this prior art, after the printing is resumed, a print line immediately before interruption of the print formation is redundantly printed to prevent occurrence of distortion of print formation contents due to the misalignment, disorder, etc. of dots before and after the cutting.

However, even in the case that the same print line is redundantly printed before and after interruption and resumption of print formation as in the prior art, the print-receiving medium may significantly be misaligned in accordance with a cutting behavior of the cutter, so that the distortion of print formation contents before and after cutting may not be prevented from occurring. Particularly, in the case that the print-receiving medium is misaligned in the width direction, the technique of the prior art cannot prevent the occurrence of distortion of print formation contents due to the misalignment, disorder, etc. of dots. Therefore, from the viewpoint of suppression of deterioration of an aesthetic appearance of a printed matter, an approach to "minimize deterioration of aesthetic appearance even in the case of occurrence of disorder etc. of dots" is beneficial as compared to an approach to "prevent occurrence of disorder etc. of dots". Such a viewpoint is not taken into consideration in the prior art.

SUMMARY

An object of the present disclosure is to provide a printed-matter producing device and a medium capable of making distortion inconspicuous in print formation contents before and after cutting to improve an aesthetic appearance of a printed matter even when disorder etc. of dots occur due to a thermal head at the time of cutting of a print-receiving medium.

In order to achieve the above-described object, according to the aspect of the present application, there is provided a printed-matter producing device comprising a feeder configured to feed a print-receiving medium along a predetermined feeding path, a thermal head configured to form a desired print on the basis of print data onto the print-receiving medium fed by the feeder, a cutting device that is configured to execute a cutting process to the print-receiving medium and is disposed downstream of the thermal head at a predetermined separation distance along the feeding path, and a controller, the controller being configured to execute a coordination control process for controlling the feeder, the thermal head, and the cutting device in coordination with each other to form a print while feeding the print-receiving medium, to stop the feeding after feeding by a first feeding distance corresponding to the separation distance and to execute the cutting process for the print-receiving medium, and to subsequently resume the feeding to produce a printed matter, a data acquisition process for acquiring the print data, and a data shift process for shifting a facing position on the print data corresponding to a position at which the thermal head faces the print-receiving medium.

BRIEF DESCRIPTION OF THE DRAWINGS

FIG. 1 is a system configuration diagram showing a print-label generating system including a print-label producing device of an embodiment of the present disclosure.

FIG. 2 is a perspective view showing an overall structure of the print-label producing device.

FIG. 3 is a perspective view showing a structure of an internal unit inside the print-label producing device.

FIG. 4 is a plane view showing the structure of the internal unit inside the print-label producing device.

FIG. 5 is an enlarged plane view schematically showing a detailed structure of a cartridge.

FIG. 6 is a functional block diagram showing a control system of the print-label producing device.

FIG. 7 is a plane view showing an example of an appearance of a print label.

FIG. 8 is a view acquired by rotating a cross-sectional view taken along a line X-X' of FIG. 7 by 90° counterclockwise.

FIG. 9A is an explanatory view showing tape feeding, print formation, and cutting behavior according to a comparative example of the embodiment of the present disclosure.

FIG. 9B is an explanatory view showing tape feeding, print formation, and cutting behavior according to the comparative example of the embodiment of the present disclosure.

FIG. 9C is an explanatory view showing tape feeding, print formation, and cutting behavior according to the comparative example of the embodiment of the present disclosure.

FIG. 9D is an explanatory view showing tape feeding, print formation, and cutting behavior according to the comparative example of the embodiment of the present disclosure.

FIG. 9E is an explanatory view showing tape feeding, print formation, and cutting behavior according to the comparative example of the embodiment of the present disclosure.

FIG. 9F is an explanatory view showing tape feeding, print formation, and cutting behavior according to the comparative example of the embodiment of the present disclosure.

FIG. 9G is an explanatory view showing tape feeding, print formation, and cutting behavior according to the comparative example of the embodiment of the present disclosure.

FIG. 9H is an explanatory view showing tape feeding, print formation, and cutting behavior according to the comparative example of the embodiment of the present disclosure.

FIG. 10A is an explanatory view showing tape feeding, print formation, and cutting behavior according to the embodiment of the present disclosure.

FIG. 10B is an explanatory view showing tape feeding, print formation, and cutting behavior according to the embodiment of the present disclosure.

FIG. 10C is an explanatory view showing tape feeding, print formation, and cutting behavior according to the embodiment of the present disclosure.

FIG. 10D is an explanatory view showing tape feeding, print formation, and cutting behavior according to the embodiment of the present disclosure.

FIG. 10E is an explanatory view showing tape feeding, print formation, and cutting behavior according to the embodiment of the present disclosure.

FIG. 10F is an explanatory view showing tape feeding, print formation, and cutting behavior according to the embodiment of the present disclosure.

FIG. 10G is an explanatory view showing tape feeding, print formation, and cutting behavior according to the embodiment of the present disclosure.

FIG. 10H is an explanatory view showing tape feeding, print formation, and cutting behavior according to the embodiment of the present disclosure.

FIG. 11 is an explanatory view showing an example of a dot pattern (before a data shift process) of the print data for forming a character string "ABC" in the embodiment of the present disclosure.

FIG. 12 is an explanatory view showing an example of a dot pattern (after the data shift process) of the print data for forming the character string "ABC" in the embodiment of the present disclosure.

FIG. 13 is a flowchart showing control procedures executed by a CPU of the print-label producing device.

FIG. 14 is a flowchart showing control procedures executed by the CPU of the print-label producing device.

FIG. 15A is a table for variably setting a scanning range in accordance with a tape width.

FIG. 15B is a table for variably setting the scanning range in accordance with the number of times of cutting operation.

FIG. 15C is a table for variably setting the scanning range in accordance with a type of an adhesive.

DETAILED DESCRIPTION OF THE PREFERRED EMBODIMENTS

An embodiment of the present disclosure will now be described with reference to the drawings. This embodiment is an embodiment in the case that the present disclosure is applied to a generating system of a print label.

<Print-Label Producing System>

FIG. 1 shows a print-label generating system including a print-label producing device that is a printed-matter producing device in this embodiment and a terminal connected to the print-label producing device. In this print-label generating system TS, a print-label producing device 1 is connected through a wired or wireless communication line NW to a terminal 118 (corresponding to an operation terminal) composed of a general-purpose computer, for example.

The terminal 118 includes an operation part 118a composed of a keyboard or a mouse etc., a display part 118b composed of a liquid crystal display etc., a CPU, a RAM, a ROM, an HDD (all not shown), etc. The CPU executes various programs stored in advance in the HDD while utilizing a temporary storage function of the RAM. Although FIG. 1 shows an example in which multiple terminals 118 and multiple print-label producing devices 1 are network-connected, the present disclosure is not limited thereto, and only the single terminal 118 and the single print-label producing device 1 may be connected.

<Appearance of Print-Label Producing Device>

As shown in FIG. 2, the print-label producing device 1 produces a print label on the basis of an operation from the terminal 118. The print-label producing device 1 includes an apparatus main body 2 having a housing 200 with a contour of a substantially hexahedral (substantially cubic) shape, and an opening/closing lid 3 disposed in an upper surface of the apparatus main body 2 in an openable and closable manner.

The housing 200 of the apparatus main body 2 includes a front wall 10 located on the device front side (on the left near side of FIG. 2) and including a label discharging exit 11 discharging a print label L produced in the apparatus main body 2 to the outside, and a front lid 12 disposed under the label discharging exit 11 in the front wall 10 and having a lower end pivotably supported.

The front lid 12 includes a pushing part 13 such that the front lid 12 is opened forward by pushing down the pushing part 13 from above. A power button 14 for powering on or off the print-label producing device 1 is disposed under an open/close button 4 on the front wall 10. Under the power button 14, a cutter drive button 16 is disposed to enable a user's manual operation to drive a cutting mechanism 15 disposed inside the apparatus main body 2.

The opening/closing lid 3 is pivotally supported at an end portion of the apparatus main body 2 on the right far side of FIG. 2 and is always urged in the opening direction via an urging member such as a spring. By pushing the opening/closing button 4 arranged adjacently to the opening/closing lid 3 on the upper surface of the apparatus main body 2, the opening/closing lid 3 is released from locking to the apparatus main body 2 and opened due to the action of the urging member. A see-through window 5 covered with a transparent cover is disposed in a center side portion of the opening/closing lid 3.

<Structure of Internal Unit>

As shown in FIG. 3, an internal unit 20 of the print-label producing device 1 is generally provided with a cartridge holder 6 storing a cartridge 7, a printing mechanism 21 including a so-called thermal head 23, a cutting mechanism (corresponding to a full-cutter) 15 including a fixed blade 40 and a movable blade 41, and a half cutting mechanism 35 (corresponding to a half-cutter) located downstream of the fixed blade 40 and the movable blade 41 in a tape transport direction and including a half-cutter 34.

An upper surface of the cartridge 7 is provided with a tape specification display part 8 displaying a tape width, a tape color, etc. of a base tape 101 (see FIG. 5 etc. described later) incorporated in the cartridge 7, for example. The cartridge holder 6 has a roller holder 25 pivotally supported by a support shaft 29 and made switchable between a print position (contact position, see FIG. 4 described later) and a release position (separated position) by a switching mechanism. A platen roller 26 and a tape pressure contact roller 28 are rotatably disposed on the roller holder 25 and, when the roller holder 25 is switched to the print position, the platen roller 26 and the tape pressure contact roller 28 are brought into pressure contact with the thermal head 23 and a feeding roller 27.

The thermal head 23 includes multiple heat generating elements and is attached to a head attaching part 24 vertically disposed on the cartridge holder 6.

The cutting mechanism 15 is arranged on the downstream side separated from the thermal head 23 by a predetermined distance (described later in detail) along a feeding path of a cover film 103. The fixed blade 40 and the movable blade 41 including a metal member are included. A drive force of a cutter motor 43 (see FIG. 6 described later) is transmitted through a cutter helical gear 42, a boss 50, and a long hole 49 to a handle part 46 of the movable blade 41 to rotate the movable blade so that a cutting operation is performed together with the fixed blade 40. This cutting state is detected by a microswitch 126 switched by an action of a cutter helical gear cam 42A.

The half cutting mechanism 35 has a receiving base 38 and the half cutter 34 arranged to face each other and also has a first guide part 36 and a second guide part 37 attached to a side plate 44 (see FIG. 4 described later) by a guide fixing part 36A. The half-cutter 34 is pivoted by a drive force of a half-cutter motor 129 (see FIG. 6 described later) around a predetermined pivoting support point (not shown). A receiving surface 38B is formed at an end portion of the receiving base 38.

FIG. 4 is a plane view showing the structure of the internal unit 20 shown in FIG. 3. In FIG. 4, the cartridge 7 is stored in the cartridge holder 6 such that a label tape 109 with print discharged from a tape discharging part 30 of the cartridge 7 and further discharged from the label discharging exit 11 has a width direction oriented in a vertical up-down direction.

The internal unit 20 is provided with a label discharging mechanism 22. The label discharging mechanism 22 discharges the label tape 109 with print (in other words, the print label L, the same applies hereinafter) cut by the cutting mechanism 15 from the label discharging exit 11 (see FIG. 2). Therefore, the label discharging mechanism 22 includes a drive roller 51 rotated by a drive force of a tape discharging motor 65 (see FIG. 6 described later), and a pressing roller 52 facing the drive roller 51 with the label tape 109 with print interposed therebetween. On the inside of the label discharging exit 11, first guide walls 55, 56 and second guide walls 63, 64 are disposed for guiding the label tape 109 with print to the label discharging exit 11. The first guide walls 55, 56 and the second guide walls 63, 64 are respectively integrally formed and are arranged at a predetermined interval from each other at a discharge position of the label tape 109 with print (print label L) cut by the fixed blade 40 and the movable blade 41.

<Detailed Structure of Cartridge>

FIG. 5 is an enlarged plane view schematically showing the detailed structure of the cartridge 7. In FIG. 5, the cartridge 7 has a housing 7A, a first roll 102 (actually having a spiral shape and simplified into a concentrically circular shape in FIG. 5) having a wound belt-shaped base tape 101 arranged in the housing 7A, a second roll 104 (actually having a spiral shape and simplified into a concentrically circular shape in FIG. 5) having the wound transparent cover film 103 with substantially the same width as the base tape 101, a ribbon supply side roll 211 feeding out an ink ribbon 105 (heat transfer printing ribbon, not necessary if the print-receiving tape is a thermal tape), a ribbon take-up roller 106 taking up the ink ribbon 105 after print, and a feeding roller 27 rotatably supported in the vicinity of the tape discharging part 30 (see FIG. 4) of the cartridge 7. The cover film 103 and the label tape 109 with print having the base tape 101 bonded to the cover film 103 correspond to a print-receiving medium described in claims.

The first roll 102 has the base tape 101 wound around a reel member 102a. The base tape 101 has a four-layer structure in this example (see a partially enlarged view of FIG. 5) and has an adhesive layer 101a made of a suitable adhesive, a colored base film 101b (base layer) made of PET (polyethylene terephthalate) etc., an adhesive layer 101c (affixing adhesive layer) made of a suitable adhesive, and a separation sheet (separation material layer) 101d laminated in this order from the inner wound side (the right side of FIG. 5) toward the opposite side (the left side of FIG. 5).

The adhesive layer 101a is formed on the front side (the right side in FIG. 5) of the base film 101b for bonding the cover film 103 later, and the separation sheet 101d is bonded to the base film 101b by the adhesive layer 101c on the back side (the left side of FIG. 5) of the base film 101b. When the print label L finally formed into a label is affixed to a desired product etc., the separation sheet 101d is peeled off so that the label can be bonded to the product etc. by the adhesive layer 101c.

The second roll 104 has the cover film 103 wound around a reel member 104a. The ribbon 105 driven by the ribbon supply side roll 211 and the ribbon take-up roller 106 is pressed by the thermal head 23 and thereby brought into contact with a back surface of the cover film 103 fed out from the second roll 104.

The feeding roller 27 feeds the base tape 101 and the cover film 103 in a direction indicated by an arrow A in FIG. 5 while pressing and bonding the tapes into the label tape 109 with print. The ribbon take-up roller 106 and the feeding roller 27 are rotationally driven in conjunction with each other by a drive force transmitted from a feeding motor 119 (corresponding to a feeder driving device. see FIG. 3 and FIG. 6 described later) that is, for example, a pulse motor provided outside the cartridge 7, through a gear mechanism not shown to a ribbon take-up roller driving shaft 107 and a feeding roller driving shaft 108, respectively. As a result, the feeding roller driving shaft 108 and the ribbon take-up roller driving shaft 107 apply a feeding drive force to the label tape 109 with print and the ink ribbon 105, respectively.

In the configuration, the base tape 101 fed out from the first roll 102 is supplied to the feeding roller 27. On the other hand, the ink ribbon 105 driven as described above comes into contact with the back surface of the cover film 103.

When the cartridge 7 is mounted on the cartridge holder 9 and the roller holder 25 (see FIG. 4) is moved from the release position to the print position, the cover film 103 and the ink ribbon 105 are interposed between the thermal head 23 and the platen roller 26, while the base tape 101 and the cover film 103 are interposed between the feeding roller 27 and the tape pressure contact roller 28. The ribbon take-up roller 106 and the feeding roller 27 are rotationally driven by the drive force of the feeding motor 119 in a synchronized manner in respective directions indicated by arrows B and C in FIG. 5. The feeding roller driving shaft 108 described above is coupled to the tape pressure contact roller 28 and the platen roller 26 by a gear mechanism (not shown), while the feeding roller 27, the tape pressure contact roller 28, and the platen roller 26 are rotated in accordance with the drive of the feeding roller driving shaft 108, so that the base tape 101 is fed out from the first roll 102 and supplied to the feeding roller 27 as described above. On the other hand, the cover film 103 is fed out from the second roll 104 and fed at a desired feeding speed, and the multiple heat generation elements of the thermal head 23 are energized by a print-head driving circuit 120 (see FIG. 6 described later). As a result, a desired print R (see FIGS. 7 and 8 described later) corresponding to print data transmitted from the terminal 118 is printed on the back surface of the cover film 103. The base tape 101 and the cover film 103 after completion of the printing are integrally bonded by the feeding roller 27 and the tape pressure contact roller 28 into the label tape 109 with print, which is discharged from the tape discharging part 30 (see FIG. 4) to the outside of the cartridge 7. The ink ribbon 105 after print onto the cover film 103 is taken up by the ribbon take-up roller 106 by driving the ribbon take-up roller driving shaft 107.

At a corresponding position of the cartridge holder 6, a cartridge sensor 81 is disposed for detecting a type of the cartridge 7 or, in other words, types of the base tape 101 and the cover film 103 (including information on material, tape width, etc.), and a detection signal of the cartridge sensor 81 is input to a CPU 111 of a control circuit 110 (see FIG. 6 described later).

The label tape 109 with print generated by affixing as described above is completely cut in the thickness direction by the cutting mechanism 15 to generate the print label L, and the generated print label L is discharged by the label discharging mechanism 22 from the label discharging exit 11 (see FIGS. 2 and 4).

<Control System>

A control system of the print-label producing device 1 of this embodiment will be described with reference to FIG. 6. In FIG. 6, the control circuit 110 is disposed on a control board (not shown) of the print-label producing device 1.

The control circuit 110 is provided with the CPU 111 controlling components, an input/output interface 113 connected to the CPU 111 via a data bus 112, a CGROM 114, a ROM 115 and a ROM 116 (corresponding to a recording medium), and a RAM 117.

The ROM 116 stores a print drive control program for reading data of a print buffer in accordance with an operation input signal from the terminal 118 to drive the thermal head 23 and the feeding motor 119, a cutting drive control program for driving the feeding motor 119 to feed the label tape 109 with print to a cutting position in the case that print is completed and driving the cutter motor 43 to cut the label tape 109 with print, a tape discharging program for driving the tape discharging motor 65 to forcibly discharge the cut label tape 109 with print (=the print label L) from the label discharging exit 11, and other various programs necessary for controlling the print-label producing device 1 (including a printed-matter producing program described later with reference to FIGS. 13 and 14). The CPU 111 performs various arithmetic operations based on various programs stored in the ROM 116 to perform overall control of the print-label producing device 1.

The RAM 117 is provided with a text memory 117A, a print buffer 117B, a parameter storage area 117E, etc. The text memory 117A stores print data input from the terminal 118. The print buffer 117B stores as dot pattern data a dot pattern for print such as multiple characters and symbols, and the thermal head 23 prints dots according to the dot pattern data stored in the print buffer 117B. The parameter storage area 117E stores various arithmetic operation data etc.

The input/output interface 113 is connected to the terminal 118, the print-head driving circuit 120 (corresponding to an energizing device) for driving the thermal head 23, a feeding-motor driving circuit 121 for driving the feeding motor 119, a cutter-motor driving circuit 122 for driving the cutter motor 43 (corresponding to a cutter driving device), a half-cutter-motor driving circuit 128 for driving the half-cutter motor 129, a tape-discharging-motor driving circuit 123 for driving the tape discharging motor 65, and the cartridge sensor 81 detecting the type of the cartridge 7.

In the case that print data is input through the terminal 118 in the control system having the control circuit 110 as a core, the text (document data) is sequentially stored in the text memory 117A, while the thermal head 23 is driven via the driving circuit 120 so that the heat generating elements are selectively driven to generate heat in accordance with print dots for one line to perform print of the dot pattern data stored in the print buffer 117B (described later in detail), and the feeding motor 119 is synchronously driven via the driving circuit 121 to feed the label tape 109 with print. When the print of the dot pattern data is completed, the feeding of the label tape 109 with print is stopped, and the cutter motor 43 is driven via the cutter-motor driving circuit 122, so that the label tape 109 with print is cut by the cutting mechanism 15. Subsequently, the tape discharging motor 65 is driven via the tape-discharging-motor driving circuit 123 to discharge the cut label tape 109 with print, i.e., the print label L, to the outside of the device.

<Energization Control of Thermal Head>

The energization control of the thermal head 23 by the print-head driving circuit 120 will be described in more detail. The thermal head 23 includes the multiple heat generating elements (not shown) arranged in a direction orthogonal to the transport direction. The multiple heat generating elements form dots corresponding to the print data on each print line of the cover film 103 and thereby form a print R (see FIGS. 7 and 8 described later). Specifically, the CPU 111 generates the print data for forming dots with the heat generating elements from, for example, character string information acquired through an operation of an operator (user) via the operation part 118a of the terminal 118. In other words, the CPU 111 generates print data (image data including data based on dots) to be printed on the basis of an input character string and the dot pattern stored in the print buffer 117B and divides the print data into lines printed by the heat generating elements arrayed on the thermal head 23. For example, in the case that the print resolution is set to 360 dpi, line print data divided into 360 lines per inch is generated. The print-head driving circuit 120 supplies a drive signal to the thermal head 23 on the basis of the line print data from the CPU 111 and controls a drive form of the thermal head 23. Therefore, the print-head driving circuit 120 writes the line print data in a data register associated with each of the heat generating elements and then controls the time and cycle of energization of each of the heat generating elements based on a strobe signal, thereby controlling a heat generating form of the entire thermal head 23.

Description will then be made of how dots are formed on each print line of the cover film 103 by energizing the thermal head 23. The print line is a line having a row of dots formed in the width direction of the cover film 103 by energizing a row of the heat generating elements in one printing cycle and exists at each interval acquired by dividing a unit length in the transport direction of the cover film 103 by the resolution. The one printing cycle is a time required for forming a row of dots in the width direction of the cover film 103. The length of one print cycle varies in accordance with the resolution and the feeding speed of the tape 103 etc. For example, one printing cycle during printing at 360 dpi and 40 mm/s is the time (e.g., about 1.8 ms) required for passing between print lines (e.g., about 0.07 mm) of 360 dpi at 40 mm/s.

Therefore, when one row of dots is formed in the width direction of the cover film 103, the line print data for one print line generated by the CPU 111 is transferred to the thermal head 23, and the corresponding heat generating elements are energized based on the transferred line print data for one print line. The line print data for one print line is printing data for forming one row of dots in the width direction of the cover film 103 by energizing one row of heat generating elements in one printing cycle. Therefore, the heat generating elements energized based on the line print data for one print line generates heat to a transfer temperature required for transferring the ink of the ink ribbon 105 to the cover film 103. As a result, a portion of the ink ribbon 105 brought into contact with the thermal head 23 is melted by heating of the heat generating elements, separated from the ink ribbon, and transferred to the cover film 103, so that dots corresponding to one print line are formed on the cover film 103. While the cover film 103 is fed at a desired feeding speed, the heating and coloring process is repeatedly executed by one print line at a time. A large number of heat generating elements arranged in the thermal head 23 are selectively and intermittently energized each time based on the print data for each print line transferred from the CPU 111. Consequently, the cover film 103 has an operator's desired dot image (text characters etc.) formed as the print R in accordance with the operator's operation through the terminal 118 described above.

As described above, as the feeding of the cover film 103 causes the print lines of the cover film 103 to sequentially pass through the position of the heat generating elements, an energization form of the heat generating elements is sequentially switched for each piece of the line print data. As a result, the thermal head 23 can perform printing at a printing cycle (in other words, printing speed) matched to the feeding speed of the cover film 103.

Example of Print Label

Description will be made of the print label L formed by completing the cutting of the label tape 109 with print by the print-label producing device 1 as described above, with reference to FIGS. 7 and 8.

The print label L has a five-layer structure in which the cover film 103 is added to the four-layer structure shown in FIG. 5 as described above. Specifically, the cover film 103, the adhesive layer 101a, the base film 101b, the adhesive layer 101c, and the separation sheet 101d are included as the five layers from the cover film 103 side (the upper side of FIG. 8) toward the opposite side (the lower side of FIG. 8).

In the print label L, the cover film 103 includes a print area S in which the label print R is printed. In each print label L, a desired label print R (characters "ABC" in this example) is printed on the back surface of the cover film 103 in the print area S.

Main Part of Embodiment

It is a main part of this embodiment to make inconspicuous a distortion that may occur in contents of the print R before and after cutting of a front margin area (described later) when the print R is formed on the cover film 103 and the print label L is produced as described above. Details of this technique will hereinafter be described with a comparative example.

Flow of Print Label Production According to Technique of Comparative Example

Before describing the technique of this embodiment, an example of a flow of production of one print label L according to a technique of the comparative example will be described with reference to FIGS. 9A to 9H.

FIG. 9A corresponds to a state before start of generation of the print label L. In this state, since a rear end portion of a previously generated print label L (not shown) is cut by the cutting mechanism 15, the label tape 109 with print including the cover film 103 (hereinafter simply referred to as a "tape 103, 109". the same applies to the figures) has a tip end located at a position facing the cutting mechanism 15.

In this state, the generation of the print label L is started by using the print data of the character string "ABC". Specifically, first, the feeding of the tape 103, 109 is started by the feeding roller 27 etc. When the transport directional position of the tape 103, 109 reaches a position at which the thermal head 23 faces the print area S, the thermal head 23 starts forming a print of the character string "ABC" in the print area S (see FIGS. 9B and 9C). In this example, a predefined margin portion ΔS (a transport directional length G) is disposed on the downstream side of the print area S in the transport direction (the left side of the figures).

As described above, the cutting mechanism 15 is located downstream of the thermal head 23 along the feeding path, and a predetermined separation distance X exists between the thermal head 23 and the cutting mechanism 15. Consequently, as shown in FIG. 9A, at the start of production of the print label L, a front margin area V is generated as a margin portion in which a new print cannot be formed. Therefore, after the production of the print label L is started as described above (see FIGS. 9A and 9B) and the formation of the print R to the print area S is started (FIG. 9 C), when a rear end portion Vr of the front margin area V faces the cutting mechanism 15, i.e., when the feeding is performed by a feeding distance (corresponding to a first feeding distance) corresponding to the separation distance X, the feeding and the formation of the print R are stopped (interrupted). In this example, as shown in FIG. 9D, the print formation is interrupted in the middle of formation of the character "B" in the character string "ABC".

After entering this feeding and print formation stop state, the tape 103, 109 is cut by the cutting mechanism 15 at the rear end portion Vr of the front margin area V, so that the front margin area V is separated from the subsequent tape 103, 109 (see FIG. 9D). At this point, instead of the complete cutting by the cutting mechanism 15, partial cutting may be performed in the thickness direction by the half cutting mechanism 35 (e.g., the cover film 103, the adhesive layer 101$a$, the base film 101$b$, and the adhesive layer 101$c$ may be cut while leaving the separation sheet 101$d$) (hereinafter the same applies to all the complete cuttings. in this description, all these complete and partial cuttings will hereinafter collectively be referred to as a "cutting process" as appropriate). Subsequently, the interrupted feeding and formation of the print R are resumed (see FIG. 9E), and the print R (the character string "ABC") is completely formed onto the print area S (see FIG. 9F). Subsequently, the tape 103, 109 is further continuously fed, and when a rear end portion Sr of the print area S (in other words, a front end portion Wf of a rear margin area W following the print area S) faces the cutting mechanism 15, the feeding is stopped (interrupted) (see FIG. 9G).

After entering this feeding stop state, the tape 103, 109 is completely cut at the rear end portion Sr of the print area S by the cutting mechanism 15, so that the print area S is separated from the subsequent tape 103, 109 (including the rear margin area W) (see FIG. 9G). Subsequently, the interrupted feeding is resumed, and when a rear end portion Wr of the rear margin area W faces the cutting mechanism 15, the feeding is stopped (interrupted) (see FIG. 9H). In this example, a transport directional length Z of the rear margin area W is set by the CPU 111 such that a total transport directional length X+Y+Z of the rear margin area W, a label main body LL including the print area S (the transport directional length Y), and the front margin area V (the transport directional length X) has a predefined constant value J. Subsequently, as shown in FIG. 9H, the tape 103, 109 is completely cut at the rear end portion Wr of the rear margin area W by the cutting mechanism 15, so that the rear margin area W is separated from the subsequent tape 103, 109.

In the formation of the print label L shown in FIGS. 9A to 9H, the print formation is interrupted due to complete cutting of the rear end portion Vr of the front margin area V as shown in FIG. 9D in the middle of the formation of the print R onto the print area S, and the formation of the print R is resumed after completion of the complete cutting. In this case, due to the characteristics of the complete cutting performed by rubbing between the fixed blade 40 and the movable blade 41, a force acts on the tape 103, 109 in the transport direction and the width direction and may cause misalignment of the tape 103, 109. Consequently, as shown in FIG. 9E, visually conspicuous misalignment, disorder, etc. of dots may occur between the print R formed on the tape 103, 109 before the complete cutting (the whole of the character "A" and the left half of the character "B" in the shown example) and the print R formed on the tape 103, 109 after resumption of the printing (the right half of the character "B" and the whole of the character "C" in the shown example), so that the aesthetic appearance of the printed matter may be deteriorated.

Flow of Print Label Production According to Technique of Embodiment

Therefore, in this embodiment, when the print formation is interrupted for the complete cutting described above with reference to FIG. 9D, a data shift process is executed to shift a facing position facing the thermal head 23 on the print data to a position making the misalignment etc. of dots inconspicuous. The details thereof will be described with reference to FIGS. 10A to 10H corresponding to FIGS. 9A to 9H.

FIGS. 10A and 10B are the same as FIGS. 9A and 9B of the comparative example, and the feeding of the tape 103, 109 is started by the feeding roller 27 etc. from the state in which the tip end of the tape 103, 109 is located at the position facing the cutting mechanism 15. As in FIG. 9C, when the transport directional position of the tape 103, 109 reaches the position at which the thermal head 23 faces the print area S, the thermal head 23 starts forming a print of the character string "ABC" in the print area S (see FIG. 10C). However, in this case, the data shift process (described later in detail) provides a margin portion ΔS1 (transport directional length G1) wider than the margin portion ΔS (transport directional length G) of the comparative example on the downstream side in the transport direction of the print area S.

Subsequently, as in FIG. 9D, when the rear end portion Vr of the front margin area V faces the cutting mechanism 15, i.e., when the feeding is performed by the feeding distance (corresponding to the first feeding distance) corresponding to the separation distance X, the feeding and the formation of the print R are stopped (interrupted) (see FIG. 10D). In this example, due to the data shift process (described later in detail), the print formation is interrupted in the middle of formation of a vertical bar portion "|" immediately after the start of the character "B" and having a smaller number of lines (described later in detail) in the character string "ABC", which is a form deviating from data contents shown in FIG. 9D.

<Example of Dot Pattern>

The definition of the "number of lines" and the setting of the margin portion ΔS1 according to the data shift process executed for reducing the number of lines will be described with reference to FIGS. 11 and 12.

FIG. 11 is an explanatory view showing an example of a dot pattern of the print data for forming the character string "ABC". In the description of this example, for convenience of explanation, the dot pattern is developed in a storage area formed in the image buffer 117B such that dot line data of 23 dots from A to W per line can be arranged up to 60 lines.

<Dot Pattern of Each Character>

First, in the shown example, a dot pattern including 98 on-dots is formed to form the character "A" in the character string "ABC". Specifically, the dot pattern for the character "A" includes, as the on-dots, dots T4-U4, dots Q5-U5, dots N6-S6, dots K7-P7, dots H8-O8, dots E9-J9, N9-O8, dots C10-G10, N10, O10, dots C11-D11, N11, O11, dots C12-G12, N12, O12, dots E13-J13, N13-O13, dots H14-O14, dots K15-P15, dots N16-S16, dots Q17-U17, and dots T18-U18.

A dot pattern including 116 on-dots is formed to form the character "B" in the character string "ABC". Specifically, the dot pattern for the character string "B" includes, as the on-dots, dots C23-U23, dots C24-U24, dots C25-D25, K25-L25, T25-U25, dots C26-D26, K26-L26, T26-U26, dots C27-D27, K27-L27, T27-U27, C28-D28, K28-L28, T28-U28, dots C29-D29, K29-L29, T29-L29, dots C30-D30, K30-L30, T31-U31, dots C32-D32, J32-M32, T32-U32, dots D33-E33, I33-N33, S33-T33, dots E34-I34, N34-S34, and dots F35-H35, O35-R35.

A dot pattern including 92 on-dots is formed to form the character "C" in the character string "ABC". Specifically, the dot pattern for the character string "C" includes, as the on-dots, dots H41-P41, dots F42-R42, dots E43-G43, Q43-S43, dots D44-F44, R44-T44, dots C45-E45, S45-T45, dots C46-D46, T46-U46, dots C47-D47, T47-U47, dots C48-D48, T48-U48, dots C49-D49, T49-U49, dots C50-D50, T50-U50, dots C51-D51, T51-U51, dots D52-F52, R52-U52, dots D53-F53, R53-T53, dots E54-I54, O54-S54, and dots G55-I55, O55-Q55.

<Detection of Number of Lines Near Head Facing Position>

In the example shown in FIG. 11, in the initial print data (before executing the data shift process), the facing position facing the thermal head 23 at the time of cutting (hereinafter appropriately referred to as a "head facing position") is the 28th line of the dot pattern forming the character "B". In this embodiment, the number of lines n is detected in a predetermined scanning range (in this example, a range of the 20th line to the 36th line, i.e., the 28th line ±8 lines) set in a sub-scanning direction (the left-right direction of the figures. in other words, the transport direction) based on multiple dots (in this example, all the 23 dots) in a main scanning direction (the up-down direction of the figures. in other words, an orthogonal direction orthogonal to the transport direction) of the 28th line.

The number of lines n is the number of places changing from off-dot to on-dot and then becoming off-dot again along the orthogonal direction (i.e., the main scanning direction) orthogonal to the transport direction. Therefore, as shown in the figure, the 20th line has no on-dot, which makes the number of lines n=0; the 21st line has no on-dot, which makes the number of lines n=0; and the 22nd line has no on-dot, which makes the number of lines n=0.

The 23rd line has only the dots C23-U23 as on-dots as described above with the dots B23-C23 changing from off-dot to on-dot and the dots U23-V23 changing from on-dot to off-dot, which makes the number of lines n=1.

The 24th line has only the dots C24-U24 as on-dots as described above with the dots B24-C24 changing from off-dot to on-dot and the dots U24-V24 changing from on-dot to off-dot, which makes the number of lines n=1.

The 25th line has the dots C25-D25, K25-L25, and T25-U25 as on-dots as described above. Therefore, the line has the dots B25-C25 changing from off-dot to on-dot and the dots D25-E25 changing from on-dot to off-dot, also has the dots J25-K25 changing from off-dot to on-dot and the dots L25-M25 changing from on-dot to off-dot, and further has the dots S25-T25 changing from off-dot to on-dot and the dots U25-V25 changing from on-dot to off-dot. This makes the number of lines n=3.

The 26th line has the dots C26-D26, K26-L26, T26-U26 as on-dots as described above. Therefore, in the same way as described above, the line has the dots B26-C26 changing from off-dot to on-dot and the dots D26-E26 changing from on-dot to off-dot, also has the dots J26-K26 changing from off-dot to on-dot and the dots L26-M26 changing from on-dot to off-dot, and further has the dots S26-T26 changing from off-dot to on-dot and the dots U26-V26 changing from on-dot to off-dot. This makes the number of lines n=3.

The 27th line has the dots C27-D27, K27-L27, T27-U27 as on-dots as described above. Therefore, in the same way as described above, the line has the dots B27-C27 changing from off-dot to on-dot and the dots D27-E27 changing from on-dot to off-dot, also has the dots J27-K27 changing from off-dot to on-dot and the dots L27-M27 changing from on-dot to off-dot, and further has the dots S27-T27 changing from off-dot to on-dot and the dots U27-V27 changing from on-dot to off-dot. This makes the number of lines n=3.

The 28th line defined as the head facing position has the dots C28-D28, K28-L28, T28-U28 are on-dots as described above. Therefore, in the same way as described above, the line has the dots B28-C28 changing from off-dot to on-dot and the dots D28-E28 changing from on-dot to off-dot, also has the dots J28-K28 changing from off-dot to on-dot and the dots L28-M28 changing from on-dot to off-dot, and further has the dots S28-T28 changing from off-dot to on-dot and the dots U28-V28 changing from on-dot to off-dot. This makes the number of lines n=3.

The 29th line has the dots C29-D29, K29-L29, T29-U29 as on-dots as described above. Therefore, in the same way as described above, the line has the dots B29-C29 changing from off-dot to on-dot and the dots D29-E29 changing from on-dot to off-dot, also has the dots J29-K29 changing from off-dot to on-dot and the dots L29-M29 changing from on-dot to off-dot, and further has the dots S29-T29 changing from off-dot to on-dot and the dots U29-V29 changing from on-dot to off-dot. This makes the number of lines n=3.

The 30th line has the dots C30-D30, K30-L30, T30-U30 as on-dots as described above. Therefore, in the same way as described above, the line has the dots B30-C30 changing from off-dot to on-dot and the dots D30-E30 changing from on-dot to off-dot, also has the dots J30-K30 changing from off-dot to on-dot and the dots L30-M30 changing from on-dot to off-dot, and further has the dots S30-T30 changing from off-dot to on-dot and the dots U30-V30 changing from on-dot to off-dot. This makes the number of lines n=3.

The 31th line has the dots C31-D31, K31-L31, T31-U31 as on-dots as described above. Therefore, in the same way as described above, the line has the dots B31-C31 changing from off-dot to on-dot and the dots D31-E31 changing from on-dot to off-dot, also has the dots J31-K31 changing from off-dot to on-dot and the dots L31-M31 changing from on-dot to off-dot, and further has the dots S31-T31 changing from off-dot to on-dot and the dots U31-V31 changing from on-dot to off-dot. This makes the number of lines n=3.

The 32th line has the dots C32-D32, J32-M32, T32-U32 as on-dots as described above. Therefore, the line has the dots B32-C32 changing from off-dot to on-dot and the dots D32-E32 changing from on-dot to off-dot, also has the dots I32-J32 changing from off-dot to on-dot and the dots M32-N32 changing from on-dot to off-dot, and further has the dots S32-T32 changing from off-dot to on-dot and the dots U32-V32 changing from on-dot to off-dot. This makes the number of lines n=3.

The 33th line has the dots D33-E33, I33-N33, S33-T33 as on-dots as described above. Therefore, the line has the dots C33-D33 changing from off-dot to on-dot and the dots E33-F33 changing from on-dot to off-dot, also has the dots H33-I33 changing from off-dot to on-dot and the dots N33-O33 changing from on-dot to off-dot, and further has the dots R33-S33 changing from off-dot to on-dot and the dots T33-U33 changing from on-dot to off-dot. This makes the number of lines n=3.

The 34th line has the dots E34-I34 and N34-S34 are on-dots, as described above. Therefore, the line has the dots D34-E34 changing from off-dot to on-dot and the dots I34-J34 changing from on-dot to off-dot and also has the dots M34-N34 changing from off-dot to on-dot and the dots S34-T34 changing from on-dot to off-dot. This makes the number of lines n=2.

The 35th line has the dots F35-H35 and O35-R35 are on-dots, as described above. Therefore, the line has the dots E35-F35 changing from off-dot to on-dot and the dots H35-I35 changing from on-dot to off-dot and also has the dots N35-O35 changing from off-dot to on-dot and the dots R35-S35 changing from on-dot to off-dot. This makes the number of lines n=2.

The 36th line has no on-dot, which makes the number of lines n=0.

<Determination of Number-of-Lines Minimized Position>

Among the 20th to 36th lines within the scanning range, the lines having the number of lines n smaller than that at the head facing position (the 28th line) except the case of n=0 is the 23th and 24th lines having n=1 and the 34th and 35th lines having n=2. Among them, the 23rd and 24th lines have the minimum number of lines n and, in this embodiment, out of the 23rd and 24th lines, the position closest to the head facing position (in this example 24th line) is determined as a number-of-lines minimized position.

<Data Shift Process>

In this embodiment, to make the misalignment etc. of dots occurring as described above inconspicuous, the data shift process is executed to shift the head facing position from the 28th line (the number of lines n=3) to the 24th line that is the number-of-lines minimized position. Specifically, first, between the number-of-lines minimized position (the 24th line) and the head facing position (the 28th line), a positional deviation on the print data (i.e., a deviation of the number of lines. in this example, four lines) is calculated (see FIG. 11). This is followed by addition of a margin of four lines to the margin portion ΔS (corresponding to the first to third lines in FIG. 11) located downstream of the print area S (corresponding to the fourth to 60th lines in FIG. 11).

Therefore, insertion of the margin of four lines on the most downstream side (the left end in FIG. 11) of the print data shown in FIG. 11 results in print data as shown in FIG. 12 such that the print data of FIG. 11 is entirely shifted to the right by four lines. Consequently, as shown in FIG. 12, the first to seventh lines all have off-dots (corresponding to a margin portion ΔS1 obtained by increasing the margin portion ΔS).

To form the character "A", the eighth to 22nd lines have dots T8-U8, dots Q9-U9, dots N10-S10, dots K11-P11, dots H12-O12, dots E13-J14, N13-O13, dots C14-G14, N14, O14, dots C15-D15, N15, O15, dots C16-G16, N16, O16, dots E17-J17, N17-O17, dots H18-O18, dot, K19-P19, dots N20-S20, dots Q21-U21, and dots T21-U21 as on-dots.

To form the character "B", the 27th to 39th lines have dots C27-U27, dots C28-U28, dots C29-D29, K29-L29, T29-U29, dots C30-D30, K30-L30, T30-U30, dots C31-D31, K31-L31, T31-U31, dots C32-D32, K32-L32, T32-U32, dots C33-D33, K33-L33, T33-U33, dots C34-D34, K34-L34, T35-U35, dots C36-D36, J36-M36, T36-U36, dots D37-E37, I37-N37, S37-T37, dots E38-I38, N38-S38, and dots F39-H39, O39-R39 as on-dots.

To form the character "C", the 45th to 59th lines have dots H45-P45, dots F46-R46, dots E47-G47, Q47-S47, dots D48-F48, R48-T48, dots C49-C48, S49-T49, dots C50-D50, dots T50 to U50, dots C51-D51, T51-U51, C52-D52, T52-U52, dots C53-D53, T53-U53, dots C54-D54, T54-U54, Dots C55-D55, T55-U55, dots D56-F56, R56-U56, dots D57-F57, R57-T57, dots E58-I58, O58-S58, and dots G59-I59, O59-Q59 as on-dots.

Due to the data shift process, the eighth to 64th lines in FIG. 12 correspond to the print area S.

Returning to FIG. 10D, due to the data shift process, when the feeding is performed by a feeding distance (corresponding to the first feeding distance. the distance is equal to the separation distance X in this example) corresponding to the separation distance X, and the feeding of the tape 103, 109 and the formation of the print R are stopped (interrupted) at this time point, the print formation is interrupted in the middle of formation of the vertical bar portion "I" of the character "B" corresponding to the number-of-lines mini-mized position (the 28th line in the example shown in FIG. 12) in the character string "ABC". The process executed from the state of FIG. 10A to the feeding and print stop state of FIG. 10D corresponds to a first process described in claims.

In this feeding and print formation stop state, the tape 103, 109 is completely cut at the rear end portion Vr of the front margin area V as described above (see FIG. 10D). This process corresponds to a second process described in claims. After completion of the complete cutting, the interrupted feeding and formation of the print R are resumed (see FIG. 10E). In this embodiment, due to setting of the wide margin portion ΔS1 as described above (in other words, correction for increasing a second feeding distance described later by setting a longer transport directional length Y1 of the label main body LL), the feeding and print formation is stopped in the vertical bar portion "I" of the character "B" having a small number of lines n. As a result, even if a misalignment occurs on the tape 103, 109 as described above, the misalignment, disorder, etc. of dots can be made relatively inconspicuous between the print R formed before the complete cutting (the whole of the character "A" and the left half of the vertical bar portion "I" of the character "B" in the shown example) and the print R formed after resumption of the printing (the right half of the vertical bar portion "I" and the entire portion on the right side thereof of the character "B" and the whole of the character "C" in the shown example) (see FIG. 10F).

After the feeding and print formation is resumed and the formation of the print R (the character string "ABC") to the print area S is then completed (see FIG. 10F), as in the comparative example, the feeding is stopped (interrupted) when the rear end portion Sr faces the cutting mechanism 15 (see FIG. 10G), and the rear end portion Sr of the print area S is completely cut (see FIG. 10g). The process executed from the state of FIG. 10D to the feeding stop state of FIG. 10G corresponds to a third process described in claims, and the feeding distance fed during this process (equal to the transport directional length Y1 of the label main body LL described later) corresponds to the second feeding distance described in claims.

Subsequently, the feeding is resumed, and when the rear end portion Wr of the rear margin area W faces the cutting mechanism 15, the feeding is stopped (interrupted) (see FIG. 10H), and the rear end portion Wr of the rear margin area W is completely cut by the cutting mechanism 15. This leads to the state of FIG. 10A at the time of production of the next print label L. This process corresponds to a fourth process described in claims.

As in the comparative example, a transport directional length Z1 of the rear margin area W in this embodiment is also set by the CPU 111 such that a total transport directional length X+Y1+Z1 of the rear margin area W, the label main body LL including the print area S (the transport directional length Y1), and the front margin area V (the transport directional length X) has the predefined constant value J.

In the above description of the example, the print label L to be generated includes the front margin area V, the label main body LL (including the print area S), and the rear margin area W; however, the present disclosure is not limited thereto, and the technique describe above is also applicable to the case of generating the print label L without the rear margin area W (i.e., without the front margin area V and the label main body LL). In this case, the process shown in FIG. 10H is not included, and the rear end portion Sr of the print area S is completely cut in FIG. 10G to achieve the state of FIG. 10A at the time of production of the next print label L. In this case, the process shown in FIG. 10G corresponds to the fourth process described in claims.

<Control Procedures>

Details of control performed by the CPU 111 based on the printed-matter producing program for implementing the technique will be described with reference to FIGS. 13 and 14.

A flow shown in FIG. 13 is started when a predetermined label producing operation for the print-label producing device 1 is performed through the terminal 118. First, at step S5, the CPU 111 generates and acquires the print data on the basis of, for example, character string information acquired through an operator's operation on the terminal 118. In the case that an operation part allowing an operator to perform the operation is disposed in the print-label producing device 1, the print data may be generated and acquired at step S5 based on the character string information etc. acquired through an operation of the operation part. Step S5 corresponds to a data acquisition step described in claims, and a process of the CPU executing step S5 corresponds to a data acquisition process described in claims.

Subsequently, at step S10, the CPU 111 determines the head facing position facing the thermal head 23 on the print data based on the print data acquired at step S5.

At step S15, the CPU 111 acquires the tape width of the cover film 103 and the base tape 101 on the basis of the detection result of the cartridge sensor 81.

Subsequently, at step S20, the CPU 111 determines the scanning range described with reference to FIG. 11 in accordance with the tape width acquired at step S15. Specifically, for example, in the case that the width dimension of the cover film 103 (the dimension in the orthogonal direction orthogonal to the transport direction) is small, a holding force to the tape 109 etc. applied by the platen roller 26, the feeding roller 27, etc. is small as compared to the case of the large width dimension, and therefore, the misalignment of the tape 109 etc. is more likely to occur during the complete cutting.

Thus, in this regard, the scanning range is variably set in this embodiment based on the width directional size of the cover film 103 by using a table (stored in an appropriate memory such as the ROM 116 and the RAM 117) shown in FIG. 15A, for example. In the shown example, the scanning range is set wide (e.g., ±12 lines in the example of FIGS. 11 and 12) in the case that the tape width is relatively small (e.g., less than 20 mm); the scanning range is set to a medium level (e.g., ±8 lines as described above in the example of FIGS. 11 and 12) in the case that the tape width is at a medium level (e.g., 20 [mm] to 40 [mm]); and the scanning range is set narrow (e.g., ±4 lines in the example of FIGS. 11 and 12) in the case that the tape width is relatively large (e.g., greater than 40 mm).

Similar to the size of the tape width, for example, in the case that the number of times of complete cutting by the cutting mechanism 15 is large, the cutting blades (the fixed blade 40 and the movable blade 41) are blunt as compared to the case that the number is small, and therefore, the misalignment of the tape 103, 109 is more likely to occur during the complete cutting. Thus, a history of the number of times of operation of the cutting mechanism 15 may be stored in an appropriate location (such as the ROM 116 and the RAM 117), and the stored history of the number of times of operation may be read at step S15 to set the scanning range in accordance with the number of times of operation. In this case, for example, on the basis of a table (stored in an appropriate memory such as the ROM 116 and the RAM 117) of FIG. 15B, the scanning range is set narrow (e.g., ±4 lines in the example of FIGS. 11 and 12) in the case that the number of times of operation is relatively small; the scanning range is set to a medium level (e.g., ±8 lines as described above in the example of FIGS. 11 and 12) in the case that the number of times of operation is at a medium level; and the scanning range is set wide (e.g., ±12 lines in the example of FIGS. 11 and 12) in the case that the number of times of operation is relatively small.

Furthermore, for example, depending on a type of the base tape 110, the included adhesive layers 101a, 101c may have a strong or weak adhesive strength (the same applies to the case that a layer thickness is large or small), and when the adhesive strength is strong, the misalignment of the tape 103, 109 is more likely to occur during the complete cutting as described above. Therefore, the adhesive strength of the adhesive layers 101a, 101c may be identified at the step S15 on the basis of a detection result of the sensor 81, and the scanning range may be set in accordance with the adhesive strength. In this case, for example, on the basis of a table (stored in an appropriate memory such as the ROM 116 and the RAM 117) of FIG. 15C, the scanning range is set narrow (e.g., ±4 lines in the example of FIGS. 11 and 12) in the case of a weak adhesive type; the scanning range is set to a medium level (e.g., ±8 lines as described above in the example of FIGS. 11 and 12) in the case of the standard type of the adhesive force; and the scanning range is set wide (e.g., ±12 lines in the example of FIGS. 11 and 12) in the case of the strong adhesive type.

The scanning range may variably be set by appropriately combining at least two of the tape width, the number of times of the complete cutting operation, and the adhesive strength. The process of the CPU 111 executing step S20 corresponds to a range setting process described in claims.

Returning to FIG. 13, subsequently at step S25, the CPU 111 counts the number of lines n of a certain line within the scanning range determined at step S20, by using the technique described above. The process of the CPU 111 executing step S25 corresponds to a number-of-lines detection process described in claims.

Subsequently, the procedure goes to step S30, and the CPU 111 determines whether or not the value of the number of lines n counted at step S25 is the minimum value of the number of lines in the lines counted until this point. In the case of the minimum value, the determination of step S30 is affirmative (S30:YES), the procedure goes to step S35, and the CPU 111 sets the latest number of lines n to a minimum number of lines $n_{min}$ and then goes to step S40. On the other hand, if the value is not the minimum value, the determination of step S30 is negative (S30:NO), and the procedure directly goes to step S40.

At step S40, the CPU 111 determines whether or not the counting of the number of lines n at step S25 is completed for all the lines within the scanning range determined at step S20. If the counting is not yet completed for all the lines, the determination is negative (S40:NO), the procedure goes to step S45 to increment the line number to be processed, and the procedure returns to step S25 to subsequently repeat the same procedure. If the counting is completed for all the lines, the determination of step S40 is affirmative (S40:YES), and the procedure goes to step S50.

At step S50, the CPU 111 determines a position of the line giving the minimum number of lines $n_{min}$ obtained by repeating the procedures of steps S25 to S45 as described above, i.e., the number-of-lines minimized position described with reference to FIG. 11 (the 24th line in the example of FIG. 11). The process of the CPU 111 executing step S50 corresponds to a position determination process described in claims. Subsequently, the procedure goes to step S55.

At step S55, the CPU 111 determines a deviation on the print data (four lines in the example of FIG. 11) between the head facing position on the print data determined at step S10 and the number-of-lines minimized position determined at step S50. In the example shown in FIG. 11, a positive value (four lines) of the deviation is obtained by subtracting the 24th line of the number-of-lines minimized position from the 28th line of the head facing position; however, in the case that the number-of-lines minimized position has a larger line number than the head facing position, this deviation is a negative value (a detailed example will not be described). The process of the CPU 111 executing step S55 corresponds to a deviation determination process described in claims. Subsequently, the procedure goes to step S60.

At step S60, the CPU 111 increases or decreases the size of the margin portion on the downstream side in the transport direction of the print area S in accordance with the deviation determined at step S55. In the example described above, the deviation (four lines) is added to the margin portion ΔS corresponding to four lines shown in FIG. 11 to obtain the margin portion ΔS1 corresponding to eight lines shown in FIG. 12 (to increase the size of the margin portion). However, in the case that the deviation is a negative value as described above, the size of the margin portion is decreased. Therefore, the CPU 111 determines whether or not the deviation is a positive value or a negative value and adds the deviation to the margin portion ΔS in the case of the positive value and subtracts the deviation from the margin portion ΔS in the case of the negative value.

As described above, increasing or decreasing the size of the downstream margin portion ΔS of the print area S to ΔS1 is equivalent to increasing or decreasing the transport directional length Y of the label main body LL (see FIG. 9. corresponding to the second feeding distance before correction) to the length Y1 (see FIG. 10. corresponding to the second feeding distance after correction). Therefore, the process of the CPU 111 executing step S60 corresponds to a correction distance generation process described in claims. Step S60 and step S55 correspond to a data shift step described in claims, and the process of the CPU 111 executing step S60 and step S55 corresponds to a data shift process described in claims.

The procedure goes to step S65, and the CPU 111 increases or decreases the length of the rear margin area W described above on the basis of the downstream margin portion ΔS1 increased or decreased at step S60. In this case, since an entire length J (see FIGS. 9H and 10H) of the print label L is fixed to a constant value in this embodiment as described above, in the case that the increase correction of four lines is made to the margin portion ΔS shown in FIG. 9 as described above, the rear margin area W has the length Z1 reduced by four lines as compared to the length Z of the rear margin area W shown in FIG. 9 (see FIG. 10H). Although not described in detail, on the contrary, when a decrease correction is made to the margin portion ΔS, the length is increased from the length Z of the rear margin area W. Therefore, the process of the CPU 111 executing step S65 corresponds to a distance increase or decrease process described in claims. Subsequently, the procedure goes to step S70 shown in FIG. 14.

In FIG. 14, at step S70, the CPU 111 initializes a flag F indicative of a complete cutting operation performed by the cutting mechanism 15 to 0. Subsequently, the procedure goes to step S75.

At step S75, the CPU 111 outputs a control signal via the input/output interface 113 to the feeding-motor driving circuit 121 to rotationally drive the feeding roller 27 and the ribbon take-up roller 106 by the drive force of the feeding motor 119. As a result, the base tape 101 is fed out from the first roll 102 and supplied to the feeding roller 27, while the cover film 103 is fed out from the second roll 104, and the base tape 101 and the cover film 103 are bonded and integrated by the feeding roller 27 and the tape pressure roller 28 and formed into the label tape 109 with print, which is fed outward from the cartridge 7 and further to the outside of the print-label producing device 1.

Subsequently, at step S80, on the basis of the print data acquired at step S5 and having contents fixed at subsequent steps S10 to S65 (simply referred to as "print data" in the following description of procedures), the CPU 111 uses a known technique (such as counting the number of pulses output from the feeding-motor driving circuit 121 driving the feeding motor 119 that is a pulse motor) to determines whether or not the cover film 103 has reached a print start position of the thermal head 23 in the print area S. After waiting in a loop while the determination is negative (S80: NO) until the print start position is reached, the determination becomes affirmative (S80:YES) when the print start position is reached, and the procedure goes to step S85.

At step S85, the CPU 111 outputs a control signal via the input/output interface 113 to the print-head driving circuit 120 to energizes the thermal head 23, thereby staring formation of the print R (e.g., a character string. in other cases, the print may be a symbol, a bar code, etc.) corresponding to the print data in the print area S of the cover film 103.

Subsequently, the procedure goes to step S90, and the CPU 111 determines whether or not the flag F is 1. If the complete cutting performed at step S105 described later results in F=1 at step S110, the determination of step S90 is affirmative (S90:YES), and the procedure goes to step S120 described later. If F=0, the determination of step S90 is negative (S90:NO), and the procedure goes to step S95.

At step S95, on the basis of the print data, the CPU 111 uses the same known technique as step S80 to determine whether or not the label tape 109 with print is fed to a front margin complete cutting position at which the rear end portion Vr of the front margin area V faces the movable blade 41 of the cutting mechanism 15. If the front margin complete cutting position is not reached, the determination is negative (S95:NO), and the procedure goes to step S120 described later, or if the determination is affirmative (S95: YES), the procedure goes to step S100.

At step S100, the CPU 111 outputs control signals via the input/output interface 113 to the feeding-motor driving circuit 121 and the tape-discharging-motor driving circuit 123 to stop the driving of the feeding motor 119 and the tape discharging motor 65, thereby stopping the rotation of the feeding roller 27, the ribbon take-up roller 106, and the drive roller 51 to stop the feeding (hereinafter simply referred to as "tape feeding" as appropriate) of the label tape 109 with print, the base tape 110, and the cover film 103. This causes the feeding-out of the base tape 101 from the first roll 102, the feeding-out of the cover film 103 from the second roll 104, and the feeding of the label tape 109 with print to stop while the movable blade 41 of the cutting mechanism 15 directly faces the rear end portion Vr of the front margin area V. At this point, the CPU 111 outputs a control signal via the input/output interface 113 to the print-head driving circuit 120 to stop the energization of the thermal head 23, thereby stopping (interrupting) the formation of the print R.

Subsequently, at step S105, the CPU 111 outputs a control signal via the input/output interface 113 to the cutter-motor driving circuit 122 to drive the cutter motor 43 to rotate the movable blade 41 of the cutting mechanism 15, thereby completely cutting (separating) all of the cover film 103, the adhesive layer 101a, the base film 101b, the adhesive layer 101c, and the separation sheet 101d of the label tape 109 with print at the rear end portion Vr of the front margin area V.

At step S110, the CPU 111 then sets the flag F to 1. Subsequently, the procedure goes to step S115.

At step S115, the CPU 111 outputs control signals via the input/output interface 113 to the feeding-motor driving circuit 121 and the tape-discharging-motor driving circuit 123 to rotationally drive the feeding roller 27, the ribbon take-up roller 106, and the drive roller 51, thereby resuming the tape feeding. Subsequently, the procedure goes to step S120.

At step S120, on the basis of the print data, the CPU 111 determines whether or not the cover film 103 has reached a print end position of the thermal head 23 in the print area S. This determination may also be detected by a known technique as described above. The determination is negative (S120:NO) until the print end position is reached, and the procedure returns to step S85 to repeat the same procedure. When the print end position is reached, the determination becomes affirmative (S120:YES), and the procedure goes to step S125.

At step S125, the CPU 111 outputs a control signal via the input/output interface 113 to the print-head driving circuit 120 to stop the energization of the thermal head 23, thereby terminating the printing of the print R. Subsequently, the procedure goes to step S130.

At step S130, on the basis of the print data, the CPU 111 uses the same known technique as step S95 to determine whether or not the label tape 109 with print is fed to a print area complete cutting position at which the rear end portion Sr of the print area S faces the movable blade 41 of the cutting mechanism 15. After waiting in a loop while the determination is negative (S130:NO) until the print area complete cutting position is reached, the determination becomes affirmative (S130:YES) when the position is reached, and the procedure goes to step S100.

At step S135, similarly to step S100, the CPU 111 stops driving the feeding motor 119 and the tape discharging motor 65 to stop the tape feeding. As a result, the tape feeding is stopped such that the movable blade 41 of the cutting mechanism 15 directly faces the rear end portion Sr of the print area S.

Subsequently, at step S140, similarly to the step S105, the CPU 111 outputs a control signal to the cutter-motor driving circuit 122 to drive the cutter motor 43 to completely cut the rear end portion Sr of the print area S of the label tape 109 with print.

At step S145, similarly to the step S115, the CPU 111 outputs control signals to the feeding-motor driving circuit 121 and the tape-discharging-motor driving circuit 123 to resume the tape feeding.

Subsequently, at step S150, on the basis of the print data, the CPU 111 uses the same known technique as step S95 and step S130 to determine whether or not the label tape 109 with print is fed to a rear margin complete cutting position at which the rear end portion Wr of the rear margin area W faces the movable blade 41 of the cutting mechanism 15. After waiting in a loop while the determination is negative (S150:NO) until the rear margin complete cutting position is reached, the determination becomes affirmative (S150:YES) when the position is reached, and the procedure goes to step S155.

At step S155, similarly to steps S100 and S135, the CPU 111 stops driving the feeding motor 119 and the tape discharging motor 65 to stop the tape feeding. As a result, the tape feeding is stopped such that the movable blade 41 of the cutting mechanism 15 faces the rear end portion Wr of the rear margin area W.

Subsequently, at step S160, similarly to steps S105 and S140, the CPU 111 outputs a control signal to the cutter-motor driving circuit 122 to drive the cutter motor 43 to completely cut the rear end portion Wr of the rear margin area W of the label tape 109 with print.

Subsequently, at step S165, the CPU 111 outputs a control signal via the input/output interface 31 to the tape-discharging-motor driving circuit 123 to drive the tape discharging motor 65 to rotate the drive roller 51. As a result, the feeding by the drive roller 51 is started, and the print label L generated as described above is fed toward the label discharging exit 11 and is discharged from the label discharging exit 11 to the outside of the print-label producing device 1. This flow is then terminated.

The process of the CPU 111 executing steps S70 to S165 shown in FIG. 14 corresponds to a coordination control process described in claims.

The present disclosure is not limited to the embodiment and can variously be modified without departing from the spirit and the technical ideas thereof. Such modification examples will hereinafter be described in order.

(1) When Data Shift Process is Executed in Operation Terminal

In the embodiment, in the flow shown in FIG. 13, the CPU 111 of the print-label producing device 1 generates and acquires print data at step S5, goes through subsequent processes of steps S10 to S50, and executes the process of shifting the generated print data as described above in the data shift process of steps S55 and S56; however, the present disclosure is not limited thereto. Therefore, the generation of print data as in step S5 and the process of shifting the print data may be performed in the terminal 118, and the shifted print data may be output from the terminal 118 and input to the print-label producing device 1, so that the print-label producing device 1 may have only the function of producing the print label L on the basis of the input print data.

In this case, a program (print process program) is stored in, for example, the ROM (corresponding to a recording medium) of the terminal 118, and the CPU included in the terminal 118 reads out the print process program to execute contents conforming to the procedures. In other words, the CPU of the terminal 118 generates and acquires the print data on the basis of, for example, character string information acquired through an operation on the operation part 118a of the terminal 118 in a procedure equivalent to step S5 (which corresponds to a data generation step).

After step S5, the CPU of the terminal 118 acquires from the print-label producing device 1 the predetermined separation distance X between the thermal head 23 and the cutting mechanism 15 in the print-label producing device 1 at a separately provided step (which corresponds to the distance acquisition step). Subsequently, the CPU of the terminal 118 determines the number-of-lines minimized position within the scanning range determined in accordance with the tape width etc. as described above in the procedures equivalent to steps S10 to S50, then determines the deviation between the head facing position and the number-of-lines minimized position in the procedures equivalent to steps S55, S60, S65 to make an adjustment to increase or decrease the margin portion on the downstream side of the print area in accordance with the deviation and make an adjustment to increase or decrease the length of the rear margin area W in accordance with the increase or decrease, and transmits the final print data after completion of these processes to the print-label producing device 1 (which corresponds to a data transmission step). On the basis of the transmitted print data, the CPU 111 of the print-label producing device 1 executes the procedures shown in FIG. 14 as in the embodiment.

(2) Other

Although a print is performed on the cover film 103 different from the base tape 101, and the base tape 101 and the cover film 103 are affixed together in the method described above; however, the present disclosure is not limited thereto, and the present disclosure may be applied to a method in which a print is performed on a print-receiving tape layer (corresponding to a print-receiving medium) included in a base tape (a type without affixing).

Furthermore, the present disclosure is not limited to a configuration that is incorporated in the cartridge 7 and that is attachable and detachable on the print-label producing device 1, and it is conceivable that the second roll 104 is detachably mounted directly on the print-label producing device 1 or that the second roll 104 is provided as a so-called installation type or an integral type (undetachable on the print-label producing device side).

It is noted that terms "vertical", "parallel", "plane", etc. in the above description are not used in the exact meanings thereof. Specifically, these terms "vertical", "parallel", "plane", etc. allow tolerances and errors in design and manufacturing and have meanings of "substantially vertical", "substantially parallel", and "substantially plane", etc.

It is noted that terms "same", "equal", "different", etc. in relation to a dimension and a size of the appearance in the above description are not used in the exact meaning thereof. Specifically, these terms "same", "equal", and "different" allow tolerances and errors in design and manufacturing and have meanings of "substantially the same", "substantially equal", and "substantially different".

However, when a value used as a predefined determination criterion or a delimiting value is described such as a threshold value (see the flowcharts of FIGS. 13 and 14) and a reference value, the terms "same", "equal", "different", etc. used for such a description are different from the above definition and have the exact meanings.

The arrows shown in FIG. 6 indicate an example of a signal flow and are not intended to limit the signal flow directions.

The flowcharts shown in FIGS. 13, 14, etc. are not intended to limit the present disclosure to the flows, and the procedures may be added or deleted or may be executed in different order without departing from the spirit and the technical ideas of the disclosure.

The techniques of the embodiment and modification examples may appropriately be utilized in combination other than those described above.

Although not exemplarily illustrated one by one, the present disclosure is implemented with other various modifications applied without departing from the spirit thereof.

What is claimed is:

1. A printed-matter producing device comprising:
   a feeder configured to feed a print-receiving medium along a predetermined feeding path;
   a thermal head configured to form a desired print on the basis of print data onto the print-receiving medium fed by said feeder;
   a cutting device that is configured to execute a cutting process to said print-receiving medium and is disposed downstream of said thermal head at a predetermined separation distance along said feeding path; and
   a controller,
   said controller being configured to execute:
   a coordination control process for controlling said feeder, said thermal head, and said cutting device in coordination with each other to form a print while feeding said print-receiving medium, to stop said feeding after feeding by a first feeding distance corresponding to said separation distance and to execute the cutting process for said print-receiving medium, and to subsequently resume said feeding to produce a printed matter;
   a data acquisition process for acquiring said print data; and
   a data shift process for shifting a facing position on said print data corresponding to a position at which said thermal head faces said print-receiving medium.

2. The printed-matter producing device according to claim 1, wherein
   in said data shift process, the facing position on said print data is shifted to make distortion inconspicuous between print formation contents after resumption of printing after execution of said cutting process and print formation contents before execution of said cutting process.

3. The printed-matter producing device according to claim 2, wherein
   said cutting device is a full-cutter configured to fully cut said print-receiving medium in a thickness direction as said cutting process.

4. The printed-matter producing device according to claim 2, wherein
   said cutting device is a half-cutter configured to partially cut said print-receiving medium in a thickness direction as said cutting process.

5. The printed-matter producing device according to claim 2, wherein
   said feeder is configured to feed said print-receiving medium at a predetermined feeding speed, wherein
   said thermal head includes a plurality of heat generating elements configured to form respective dots on print lines divided to print resolution with respect to said print-receiving medium to be fed, wherein
   said printed-matter producing device further comprises:
   a feeder driving device configured to drive said feeder;
   an energizing device configured to selectively control driving of said plurality of heat generating elements in accordance with said print data; and
   a cutter driving device configured to drive said cutting device; wherein
   said coordination control process includes:
   a first process, a second process, and a third process performed by means of controlling said feeder driving device, said energizing device, and said cutter driving device in coordination with each other,
   a first process being for performing feeding by said first feeding distance while forming a print composed of dots corresponding to said print data at a predetermined printing speed synchronized with said predetermined feeding speed onto a print area of said print-receiving medium that includes a front margin area having a length corresponding to said separation distance and said print area subsequent to said front margin area and that is fed at said predetermined feeding speed;

a second process being for stopping said feeding area after said first process and executing a cutting process at a rear end of said front margin; and a third process being for resuming said feeding after said second process and completing formation of said dots onto said print area to produce said printed matter; wherein said controller is configured to further execute a number-of-lines detection process for detecting the number of lines indicative of the number of places changing from off-dot to on-dot and then becoming off-dot again along an orthogonal direction orthogonal to a transport direction in said print at execution timing of said second process on the basis of said print data acquired in said data acquisition process, and wherein, in said data shift process, said facing position on said print data is shifted to reduce said number of lines at said execution timing detected by said number-of-lines detection process.

6. The printed-matter producing device according to claim 5, wherein said coordination control process further includes a fourth process for controlling said feeder driving device, said energizing device, and said cutter driving device in coordination with each other to stop the feeding after feeding by a second feeding distance and completing the formation of said dots onto said print area in said third process and to execute the cutting process at a rear end of said print area or at a rear end of a desired rear margin area subsequent to said print area.

7. The printed-matter producing device according to claim 6, wherein in said data shift process, said facing position on said print data is shifted by making a correction to increase or decrease said second distance, and wherein said controller is configured to further execute a distance increase and decrease process for, at the time of the cutting process for the rear end of said rear margin area in the fourth process, decreasing a length of said rear margin area along said transport direction in the case that said second feeding distance of feeding by said feeder before the cutting process is increased due to said correction in said data shift process, or increasing the length of said rear margin area in the case that said feeding distance of feeding by said feeder before the cutting process is decreased due to said correction in said data shift process.

8. The printed-matter producing device according to claim 7, wherein said controller is configured to further execute a position determination process for determining a number-of-lines minimized position on said print data in a scanning range set along a sub-scanning direction before and after a plurality of dots in a main scanning direction at execution timing of said second process such that said number of lines is minimized in the main scanning direction on the basis of said print data acquired in the data acquisition process, and wherein said data shift process includes:

a deviation determination process for determining a deviation between said facing position on said print data and said number-of-lines minimized position determined in said position determination process; and a correction distance generation process for generating said second feeding distance after said correction by adding or subtracting said deviation determined in the deviation determination process to or from said second feeding distance before said correction.

9. The printed-matter producing device according to claim 8, wherein said controller is configured to further execute a range setting process for variably setting said scanning range on the basis of at least one of a width dimension of said print-receiving medium, a history of the number of times of operation of said cutting device, and a type of said print-receiving medium.

10. A non-transitory computer-readable medium storing a printed-matter producing program for executing steps on a controller of a printed-matter producing device comprising a feeder configured to feed a print-receiving medium along a predetermined feeding path, a thermal head configured to form a desired print on the basis of print data onto the print-receiving medium fed by said feeder, a cutting device that is configured to execute a cutting process to said print-receiving medium and is disposed downstream of said thermal head at a predetermined separation distance along said feeding path, and said controller, said steps comprising:

a coordination control step for controlling said feeder, said thermal head, and said cutting device in coordination with each other to form a print while feeding said print-receiving medium, to stop said feeding after feeding by a first feeding distance corresponding to said separation distance and to execute the cutting process for said print-receiving medium, and to subsequently resume said feeding to produce a printed matter;

a data acquisition step for acquiring said print data; and a data shift step for shifting a facing position on said print data corresponding to a position at which said thermal head faces said print-receiving medium to make distortion inconspicuous between print formation contents after resumption of printing after execution of said cutting process and print formation contents before execution of said cutting process.

11. A non-transitory computer-readable medium storing a printed-matter producing program for executing steps on a computer included in an operation terminal for operating a printed-matter producing device that comprises a feeder configured to feed a print-receiving medium along a predetermined feeding path, a thermal head configured to form a desired print on the basis of print data onto the print-receiving medium fed by said feeder, and a cutting device that is configured to execute a cutting process to said print-receiving medium and is disposed downstream of said thermal head at a predetermined separation distance along said feeding path, said printed-matter producing device being configured to form a print while feeding said print-receiving medium, to stop said feeding after feeding by a first feeding distance corresponding to said separation distance and to execute the cutting process for said print-receiving medium, and to subsequently resume said feeding to produce a printed matter, said steps comprising:

a data generation step for generating said print data;

a distance acquisition step for acquiring said separation distance; and a data transmission step for executing a data shift process for shifting a facing position on said print data corresponding to a position at which said thermal head faces said print-receiving medium to make distortion inconspicuous between print formation contents after resumption of printing after execution of said cutting process and print formation contents before execution of said cutting process and for transmitting said print data after said data shift process to said printed-matter producing device.

* * * * *